United States Patent
Mann

(10) Patent No.: US 7,475,002 B1
(45) Date of Patent: Jan. 6, 2009

(54) METHOD AND APPARATUS FOR EMULATING MULTIPLE VIRTUAL TIMERS IN A VIRTUAL COMPUTER SYSTEM WHEN THE VIRTUAL TIMERS FALL BEHIND THE REAL TIME OF A PHYSICAL COMPUTER SYSTEM

(75) Inventor: Timothy P. Mann, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 659 days.

(21) Appl. No.: 10/782,092

(22) Filed: Feb. 18, 2004

(51) Int. Cl.
G06F 9/455 (2006.01)
G06F 1/00 (2006.01)
G06F 1/04 (2006.01)

(52) U.S. Cl. ............... 703/23; 703/24; 703/27; 703/21; 718/1; 713/501; 713/502

(58) Field of Classification Search ........ 718/1; 703/19, 23, 24
See application file for complete search history.

(56) References Cited

U.S. PATENT DOCUMENTS

| | | | | |
|---|---|---|---|---|
| 4,812,967 A | * | 3/1989 | Hirosawa et al. | 710/269 |
| 4,814,975 A | * | 3/1989 | Hirosawa et al. | 718/1 |
| 5,095,427 A | * | 3/1992 | Tanaka et al. | 718/1 |
| 5,295,265 A | * | 3/1994 | Ducateau et al. | 718/100 |
| 5,488,713 A | * | 1/1996 | Norton et al. | 703/22 |
| 5,621,912 A | * | 4/1997 | Borruso et al. | 718/1 |
| 5,774,479 A | * | 6/1998 | Lee et al. | 714/749 |
| 5,898,855 A | * | 4/1999 | Onodera et al. | 718/1 |
| 6,067,604 A | * | 5/2000 | Ramachandran et al. | 711/149 |
| 6,349,388 B1 | * | 2/2002 | Russell | 713/502 |
| 6,530,078 B1 | * | 3/2003 | Shmid et al. | 717/138 |
| 6,550,015 B1 | * | 4/2003 | Craycraft et al. | 713/502 |
| 6,691,303 B2 | * | 2/2004 | Guthrie et al. | 717/124 |

(Continued)

OTHER PUBLICATIONS

Virtual machine-based simulation of distributed computing and network computing Richard T. Wang, J. C. Browne Sep. 1981 ACM SIGMETRICS Performance Evaluation Review, Proceedings of the 1981 ACM SIGMETRICS conference on Measurement and modeling of computer systems SIGMETRICS '81, vol. 10 Issue 3.*

(Continued)

*Primary Examiner*—Kamini S Shah
*Assistant Examiner*—Akash Saxena
(74) *Attorney, Agent, or Firm*—Darryl A. Smith; Rajeev Madnawat

(57) ABSTRACT

A virtual computer system includes multiple timer emulators for emulating multiple virtual timers in a virtual machine (VM). A time coordinator keeps track of an apparent time that is provided to the multiple timer emulators for presentation to the VM through the virtual timers. In particular, the time coordinator ensures that timer events generated by the multiple timer emulators are presented to the VM in an appropriate sequence and with substantially appropriate relative apparent times. Also, when guest software reads a count from a virtual timer, the time coordinator ensures that the apparent time presented to the guest software is substantially consistent with the apparent times represented by preceding and succeeding timer events. When the apparent time falls behind the real time of the physical computer system, the time coordinator speeds up the apparent time until it catches up to the real time.

19 Claims, 9 Drawing Sheets

U.S. PATENT DOCUMENTS

| | | | |
|---|---|---|---|
| 6,795,966 B1* | 9/2004 | Lim et al. | 718/1 |
| 6,882,968 B1* | 4/2005 | Linden | 703/26 |
| 7,133,422 B2* | 11/2006 | Liu et al. | 370/503 |
| 7,136,800 B1* | 11/2006 | Vega | 703/23 |
| 7,146,305 B2* | 12/2006 | van der Made | 703/22 |
| 7,155,629 B2* | 12/2006 | Lange-Pearson et al. | 713/500 |
| 7,219,047 B2* | 5/2007 | Cohen et al. | 703/17 |
| 7,299,468 B2* | 11/2007 | Casey et al. | 718/104 |
| 2003/0074390 A1* | 4/2003 | Hudson | 709/108 |
| 2003/0217250 A1* | 11/2003 | Bennett et al. | 712/224 |
| 2004/0148604 A1* | 7/2004 | Steffens et al. | 718/100 |
| 2005/0027500 A1* | 2/2005 | Cornhill et al. | 703/13 |
| 2005/0071840 A1* | 3/2005 | Neiger et al. | 718/1 |
| 2005/0204357 A1* | 9/2005 | Garg et al. | 718/1 |
| 2006/0075402 A1* | 4/2006 | Neiger et al. | 718/1 |
| 2006/0130059 A1* | 6/2006 | Bennett et al. | 718/1 |
| 2007/0033589 A1* | 2/2007 | Nicholas et al. | 718/1 |

OTHER PUBLICATIONS

A Virtual machine emulator for performance evaluation M. D. Canon, D. H. Fritz, J. H. Howard, T. D. Howell, M. F. Mitoma, J. Rodriquez-Rosell Feb. 1980 Communications of the ACM, vol. 23 Issue 2.*

Virtual time David R. Jefferson Jul. 1985 ACM Transactions on Programming Languages and Systems (TOPLAS), vol. 7 Issue 3.*

* cited by examiner

FIG. 6A

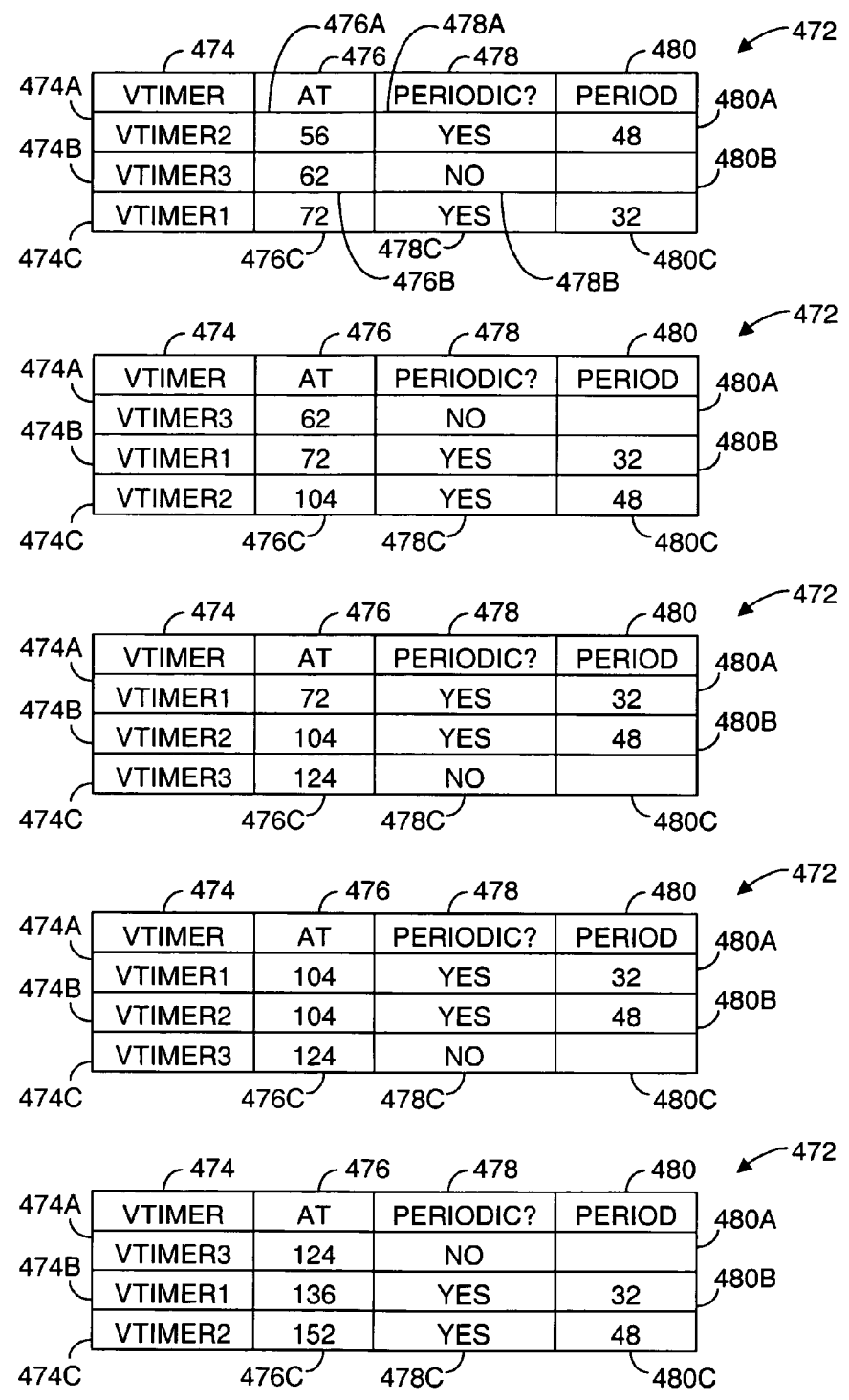

| VTIMER | AT | PERIODIC? | PERIOD |
|---|---|---|---|
| VTIMER2 | 56 | YES | 48 |
| VTIMER3 | 62 | NO | |
| VTIMER1 | 72 | YES | 32 |

FIG. 6B

| VTIMER | AT | PERIODIC? | PERIOD |
|---|---|---|---|
| VTIMER3 | 62 | NO | |
| VTIMER1 | 72 | YES | 32 |
| VTIMER2 | 104 | YES | 48 |

FIG. 6C

| VTIMER | AT | PERIODIC? | PERIOD |
|---|---|---|---|
| VTIMER1 | 72 | YES | 32 |
| VTIMER2 | 104 | YES | 48 |
| VTIMER3 | 124 | NO | |

FIG. 6D

| VTIMER | AT | PERIODIC? | PERIOD |
|---|---|---|---|
| VTIMER1 | 104 | YES | 32 |
| VTIMER2 | 104 | YES | 48 |
| VTIMER3 | 124 | NO | |

FIG. 6E

| VTIMER | AT | PERIODIC? | PERIOD |
|---|---|---|---|
| VTIMER3 | 124 | NO | |
| VTIMER1 | 136 | YES | 32 |
| VTIMER2 | 152 | YES | 48 |

METHOD AND APPARATUS FOR EMULATING MULTIPLE VIRTUAL TIMERS IN A VIRTUAL COMPUTER SYSTEM WHEN THE VIRTUAL TIMERS FALL BEHIND THE REAL TIME OF A PHYSICAL COMPUTER SYSTEM

BACKGROUND OF THE INVENTION

1. Field of the Invention

This invention relates to the field of computer virtualization, that is, to systems and methods for implementing computers as software running on an underlying host hardware platform.

2. Description of the Related Art

Virtualization has brought many advantages to the world of computers. As is well known in the art, a virtual machine (VM) is a software abstraction—a "virtualization"—of a physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

Example of a Virtualized System

FIG. 1 illustrates the main components of a system 10 that supports a virtual machine as implemented in the Workstation product of VMware, Inc. As in conventional computer systems, both system hardware 100 and system software 220 are included. The system hardware 100 includes CPU(s) 102, which may be a single processor, or two or more cooperating processors in a known multiprocessor arrangement. The system hardware also includes system memory 104, one or more disks 106, and some form of memory management unit (MMU) 108. As is well understood in the field of computer engineering, the system hardware also includes, or is connected to, conventional registers, interrupt-handling circuitry, a clock, etc., which, for the sake of simplicity, are not shown in the figure.

The system software 220 either is or at least includes an operating system (OS) 230, which has drivers 240 as needed for controlling and communicating with various devices 110, and usually with the disk 106 as well. Conventional applications 255, if included, may be installed to run on the hardware 100 via the system software 220 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 320 includes a guest operating system 330, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 355 installed to run on the guest OS 330; any number of applications, including none at all, may be loaded for running on the guest OS, limited only by the requirements of the VM. The guest system software 320, including the guest OS 330, and the guest applications 355 are referred to collectively herein as the "guest software."

Note that although the hardware "layer" 301 will be a software abstraction of physical components, the VM's system software 320 may be the same as would be loaded into a hardware computer. The modifier "guest" is used here to indicate that the VM, although it acts as a "real" computer from the perspective of a user, is actually just computer code that is executed on the underlying "host" hardware and software platform 100, 220. Thus, for example, I/O to the virtual device 310 will actually be carried out by I/O to the hardware device 110, but in a manner transparent to the VM.

If the VM is properly designed, then the applications (or the user of the applications) will preferably not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity, to illustrate the structure and operation of that single VM; in many installations, there will be more than one VM installed to run on the common hardware platform; all will typically have essentially the same general structure, although the individual components need not be identical.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 34-45.

A VMM is usually a relatively thin layer of software that runs directly on top of a host, such as the system software 220, or directly on the hardware, and virtualizes the resources of the (or some) hardware platform. The VMM will typically include at least one device emulator 410, which may also form the implementation of the virtual device 310. The interface exported to the respective VM is usually such that the guest OS 330 cannot determine the presence of the VMM. The VMM also usually tracks and either forwards (to the host OS 230) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 220 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 330. Furthermore, it may in some cases be beneficial to deploy VMMs on top of a thin software layer, a "kernel," constructed specifically for this purpose.

FIG. 2 illustrates yet another implementation, in which a kernel 650 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 230 of the underlying physical computer, or whatever system-level software handles actual I/O operations, takes faults and interrupts, etc. for the VM. The invention may be used in all the different configurations described above.

Memory Mapping and Address Terminology

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 208 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 108. The TLB contains, among other information, VPN-to-PPN mapping entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. After the TLB miss fault is handled, the same memory access is attempted again, and this time, the required VPN-to-PPN mapping is found in the TLB. The OS thus specifies the mapping, but the hardware MMU 108 usually actually performs the conversion of one type of page number to the other. Below, for the sake of simplicity, when it is stated that a software module "maps" page numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 355 in the VM 300 is remapped twice in order to determine which page of the hardware memory is intended. A mapping module 308 within the guest OS 330 translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 408 in the VMM 400 therefore takes the GPPN issued by the guest OS 330 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. FIG. 1 shows a direct execution engine 403 and a binary translation engine 405, for performing these respective functions. Combining these techniques allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 355 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 230 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 230. To make this possible, a special driver VMdrv 242 is installed as any other driver within the host OS 230 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 220.

Timers in Virtual Computer Systems

A typical physical computer system contains multiple timers. Thus, FIG. 1 shows a plurality of timers 160. The configuration, operation and use of timers may vary from system to system. In a typical example of the use of a timer, however, the timer may be configured to count from zero up to a specific, final value, counting at a set frequency. When the timer reaches the final value, it may generate a timer interrupt to notify a software routine that it has finished its count, or it may notify a software routine in some other manner. Such a timer interrupt or other notification is referred to as a timer event. The timer may be further configured to reset to zero after it has reached the final value, and begin counting again up to the same final value, implementing a periodic timer. Alternatively, the timer may be configured to simply stop once it reaches the final value, implementing a one-shot timer.

One common use for a timer is to keep track of the time of day or to keep track of how much time has elapsed since some point in time. For such a task, the timer may be set up as a periodic timer; generating timer interrupts at a constant frequency. The interrupts generated by the timer may be counted to keep track of the time with a resolution that is equal to the period of the timer. To further refine the time-keeping function, the timer may also be read from time to time. At an instant when the timer is read, the time may be determined more precisely by adding the time represented by the count of the timer to the time represented by the number of timer interrupts that have occurred. Using this technique, the resolution of the time keeping-function is limited only by the frequency at which the timer is set up to count.

A VM preferably also includes a plurality of timers. Thus, FIG. 1 also shows a plurality of virtual timers (VTIMERS) 360 within the VM 300. The hardware platform of the VM 300, which is exported by the VMM 400, may be a specific platform that is also implemented in physical computer systems. For example, the hardware platform of the VM 300 may be a standard PC (personal computer) platform based on a microprocessor having the Intel IA-32 architecture. When the hardware platform of the VM 300 matches a common physical hardware platform, the virtual timers 360 exported to the VM 300 preferably function substantially the same as the timers in a physical implementation of the hardware platform.

Each virtual timer 360 within the VM 300 may be virtualized by a separate timer emulator, or a single timer emulator may virtualize multiple virtual timers 360. Thus, FIG. 1 also shows a plurality of timer emulators 460 for virtualizing (or emulating or exporting) the virtual timers 360. Each timer emulator 460 preferably emulates its respective virtual timer (s) 360 in a manner such that the guest software in the VM 300 and/or a user of the VM 300 cannot tell that the virtual timer 360 is not a "real" timer, implemented directly in hardware in a physical implementation of the hardware platform. Thus, for example, a virtual timer 360 may preferably also be configured to count from zero up to a specific, final value, counting at a set frequency, either as a periodic timer or as a one-shot timer, and to generate a timer interrupt or other timer event upon reaching the final value. The guest software may preferably use the virtual timers 360 in the same manner that it would use actual hardware timers in a physical implementation of the virtualized hardware platform.

In a physical computer system, the operation of the multiple timers is generally accurate and consistent, and the software executing on physical computer systems generally relies on the accuracy and consistency of these timers. In some situations, the software executing on a physical computer system may rely on the consistency of multiple timers with respect to each other, so that if the timing of one timer is not consistent with the timing of another timer, the software may not function properly. The software creates a dependency between multiple timers and the software expects this dependency to be met. As an example, a first timer may be set to generate timer events at a first frequency and a second timer may be set to generate timer events at a second frequency, with the second frequency being twice the first frequency. If the second timer does not generate timer events twice as often as the first timer, the software may not function properly; or if the timer events of the two timers are inconsistent in some other manner, the software may not function properly.

The VM 300 is preferably designed to execute much of the same software that can execute on a corresponding physical computer system. Thus, the guest software in the VM 300 may also use the virtual timers 360 in a manner that gives rise to a dependency between the multiple virtual timers 360. In this case, there must be some measure of consistency between the multiple virtual timers 360, or the guest software may not function properly. In particular, the guest software may not function in the same manner as the software would function if it were executed in a physical computer system implementing the same hardware platform. For example, if the timer events generated by the virtual timers 360 do not occur in the same relative order within the VM 300 as they would occur if the guest software were running on a physical computer system, the guest software may not run correctly in the VM 300. Also, if the relative intervals between the timer events generated by the virtual timers 360 do not approximate the relative intervals that would occur in a physical computer system, the guest software again may not run correctly.

As one particular example, suppose that the VM 300 implements a common symmetric multiprocessing (SMP) hardware platform, and that the guest OS 330 is a version of Linux that executes on a SMP computer. SMP Linux is critically dependent on a certain level of consistency between the multiple timers in a computer system. If this level of consistency is not met, then the computer system will not operate properly.

What is needed, therefore, is a method and apparatus for emulating multiple timers in a virtual computer system with sufficient consistency to enable guest software to execute properly, preferably in the same manner as the guest software would execute on a comparable physical computer system.

SUMMARY OF THE INVENTION

The invention comprises a time coordinator that provides consistent timing information for multiple virtual timers in a virtual computer system. The time coordinator preferably provides information that enables timer events from the multiple virtual timers to be generated in the same order in which they would be generated in a corresponding physical computer system. The time coordinator preferably also provides information that enables counts or time values that are read from the multiple virtual timers to be made consistent with each other and with the timer events. When a time value is read from a virtual timer, the value provided in response to the read preferably represents a time that falls between a most recent previous time incident, which may be a previous timer event or a previous reading of a virtual timer, and the time at which the next timer event is due to occur. In some embodiments of the invention, the time coordinator maintains a timer event queue, which contains information regarding timer events for the virtual timers.

In some embodiments of the invention, the time coordinator keeps track of an apparent time, which comprises all time representations provided to guest software in a virtual machine (VM), including all timer events and all time values that are read from the virtual timers. The average rate at which the apparent time runs is preferably approximately equal to the rate at which the real time of the physical computer system runs. The apparent time of the VM may at times fall behind the real time of the physical computer system because the VM may not run continuously on the physical computer system, or because a minimum processing time is provided between multiple events that occur at the VM, or for other reasons. In some embodiments of the invention, the time coordinator goes into a catch-up mode when the apparent time falls behind the real time. The time coordinator then runs the apparent time faster than the real time until the apparent time catches up with the real time. After the apparent time catches up with the real time, the time coordinator goes back into a normal mode, and runs the apparent time at approximately the same rate as the real time.

The virtual computer system may comprise one or more device emulators for emulating the virtual timers. In this case, the time coordinator provides consistent timing information to each of the device emulators, which enables the device emulators to ensure that the multiple virtual timers are consistent with each other. In some embodiments, the time coordinator notifies the device emulators when timer events should be generated for the virtual timers. Also, in some embodiments, when a time value is read from a virtual timer, the time coordinator provides a time value that may be used when responding to the reading of the virtual timer.

BRIEF DESCRIPTION OF THE DRAWINGS

FIG. 6A illustrates a timer event queue that may be used in implementing this invention, showing the contents of the queue at a first point in time.

FIG. 6B illustrates the timer event queue of FIG. 6A at a second point in time.

FIG. 6C illustrates the timer event queue of FIG. 6A at a third point in time.

FIG. 6D illustrates the timer event queue of FIG. 6A at a fourth point in time.

FIG. 6E illustrates the timer event queue of FIG. 6A at a fifth point in time.

DETAILED DESCRIPTION

Figure 1:
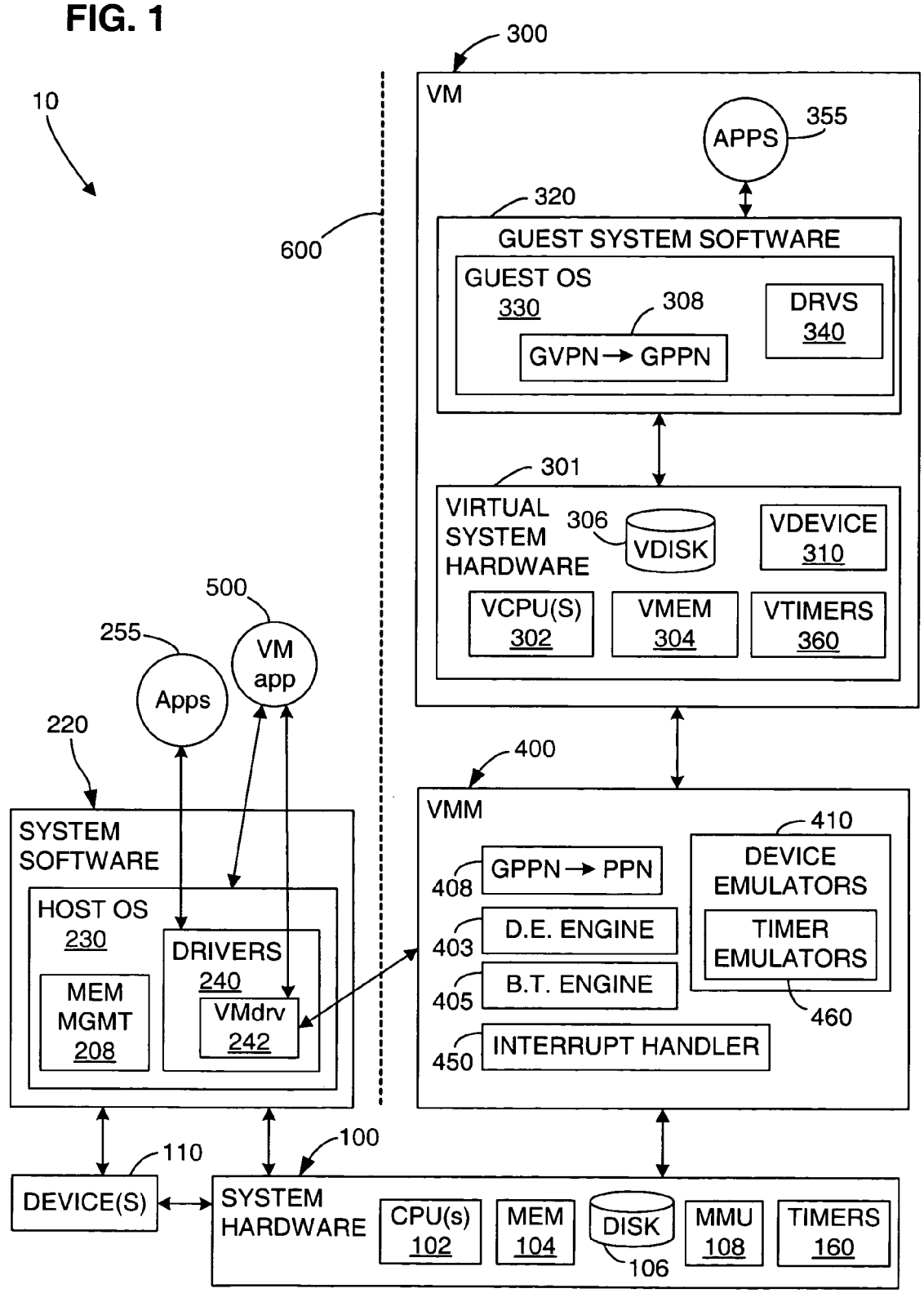
FIG. 1 illustrates a virtual computer system installed on a host platform, with a virtual machine monitor (VMM) at the same system level as the host operating system.

This invention may be advantageously implemented in any virtual computer system that includes multiple virtual timers. One such virtual computer system is described herein, by way of example. An example implementation of the invention is also described herein. Other implementations of the invention may vary substantially in a number of ways from the example implementation described herein.

As described above, FIG. 1 shows a plurality of hardware timers 160 within the system hardware 100 of a physical computer system. A VMM (virtual machine monitor) 400 executes on the system hardware 100 to support a VM (virtual machine) 300 within the virtual computer system 10. The VMM 400 includes a plurality of timer emulators 460 for emulating a plurality of virtual timers (VTIMERS) 360. Suppose there are three virtual timers 360, namely a first virtual timer 362, a second virtual timer 364 and a third virtual timer 366. The virtual timers 360 preferably function in substantially the same manner as a hardware timer functions.

Figure 3A:
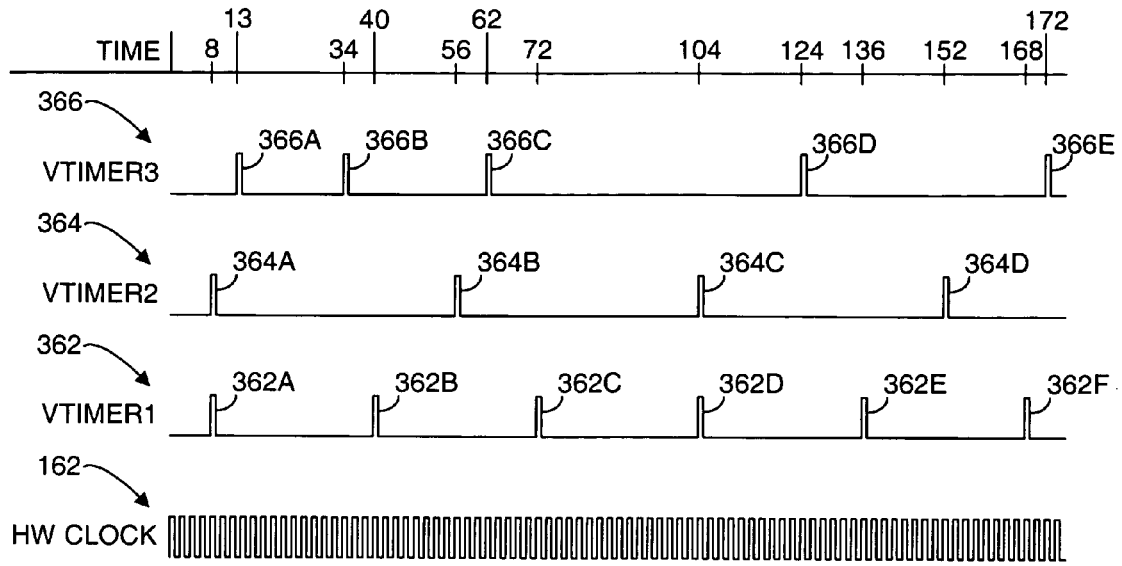
FIG. 3A is a timing diagram, illustrating the operation of a plurality of virtual timers within a virtual machine (VM), when the VM is able to run continuously.

FIG. 3A is a timing diagram illustrating one possible scenario for the operation of the virtual timers 360. Suppose the system hardware 100 includes a hardware clock 162, as illustrated in FIG. 3A. Although a hardware clock would typically have a much higher frequency relative to the virtual timers 360 than is illustrated in FIG. 3A, the representation of the hardware clock 162 in FIG. 3A is simply intended to show that the hardware clock operates without interruption, at a constant frequency. All of the timing diagrams in this application are drawn to the same scale, with each rising edge and each falling edge of the hardware clock 162 representing one arbitrary unit of time, so that the period for the hardware clock 162 is two units of time.

FIG. 3A also illustrates that each of the virtual timers 360 generates a plurality of timer events. Specifically, the first virtual timer (VTIMER1) 362 generates a first timer event 362A at a time 8, a second timer event 362B at a time 40, a third timer event 362C at a time 72, a fourth timer event 362D at a time 104, a fifth timer event 362E at a time 136 and a sixth timer event 362F at a time 168; the second virtual timer (VTIMER2) 364 generates a first timer event 364A at the time 8, a second timer event 364B at a time 56, a third timer event 364C at the time 104 and a fourth timer event 364D at a time 152; and the third virtual timer (VTIMER3) 366 generates a first timer event 366A at a time 13, a second timer event 366B at a time 34, a third timer event 366C at a time 62, a fourth timer event 366D at a time 124 and a fifth timer event 366E at a time 172. Each of the timer events illustrated in FIG. 3A may represent, for example, a timer interrupt that is issued to the guest software of the VM 300. Thus, for example, at the time 8, the timer emulator for the first timer 362 may generate a timer interrupt to the guest software of the VM 300, representing the timer event 362A.

Suppose that the timer events illustrated in FIG. 3A occur at the times illustrated in FIG. 3A as a result of the actions of the guest software of the VM 300. Suppose further that this same relative timing of the timer events would occur if the guest software were executing directly on a comparable physical computer system and the virtual timers 360 were actually hardware timers. Thus, the first virtual timer 362 is operating as a periodic timer having a period of 32 units of time, while the second virtual timer 364 is operating as a periodic timer having a period of 48 units of time, with the timer events 362A and 364A coinciding at the time 8, and the timer events 362D and 364C coinciding at the time 104. Meanwhile, the third timer 366 is operating as a one-shot timer that has been set up separately to generate each of the timer events illustrated in FIG. 3A. First, the third timer 366 is set up to generate the first timer event 366A at the time 13. Next, the third timer 366 is set up to generate the second timer event 366B at the time 34. Next, the third timer 366 is set up to generate the third timer event 366C at the time 62. Next, the third timer 366 is set up to generate the fourth timer event 366D at the time 124. Finally, the third timer 366 is set up to generate the fifth timer event 366E at the time 172.

If the VM 300 is the only software entity executing on the system hardware 100, besides the VMM 400 and other software routines executing in support of the VM 300, then it is generally not difficult to emulate the virtual timers 360 to approximate the functionality of hardware timers. For example, a separate hardware timer 160 may be used to provide the functionality of each of the virtual timers 360. When a virtual timer 360 is programmed by guest software to generate one or more timer events, the corresponding timer emulator 460 may program the corresponding hardware timer 160 in a corresponding manner to generate one or more timer events at substantially the same time(s) as the virtual timer 360 is to generate timer events.

For example if a virtual timer 360 is setup to implement a periodic timer having a specific frequency, the corresponding hardware timer 160 may also be setup to implement a periodic timer having the same frequency. The timer emulators 460 can then respond to timer events generated by the hardware timers 160 and generate corresponding timer events to the VM 300. Thus, if a hardware timer 160 generates a timer interrupt to mark a timer event, the corresponding timer emulator 460 may pass the interrupt on to the guest software in the VM 300 as if the timer interrupt were generated by the corresponding virtual timer 360. Similarly, when the guest software within the VM 300 attempts to read a count from a virtual timer 360, the corresponding timer emulator 460 may read a count from the corresponding hardware timer 160 and convert it into an appropriate count for the virtual timer 360 before providing it to the guest software. Using this technique, or other techniques, the virtual timers 360 can be accurately emulated to function substantially the same as a hardware timer 160, again assuming that the VM 300 and other software entities executing in support of the VM 300 are the only software entities executing on the system hardware 100.

The emulation of the virtual timers 360 becomes more difficult, however, if other software entities also execute on the system hardware 100. For example, suppose that additional VMs are also executing on the system hardware 100, supported by separate VMMs. In this case, the multiple VMs, along with their supporting VMMs, may be allowed to execute on the system hardware 100 in a time-sharing arrangement just like multiple processes in a multitasking computer system. Each of the VMs in the system that is ready to execute instructions at a given time is allowed to execute during specific time slices, but each VM is not allowed to execute during the time slices that are assigned to other VMs. Thus, the VM 300 will have some time slices in which it is allowed to execute and other time slices in which it is not allowed to execute.

Figure 3B:
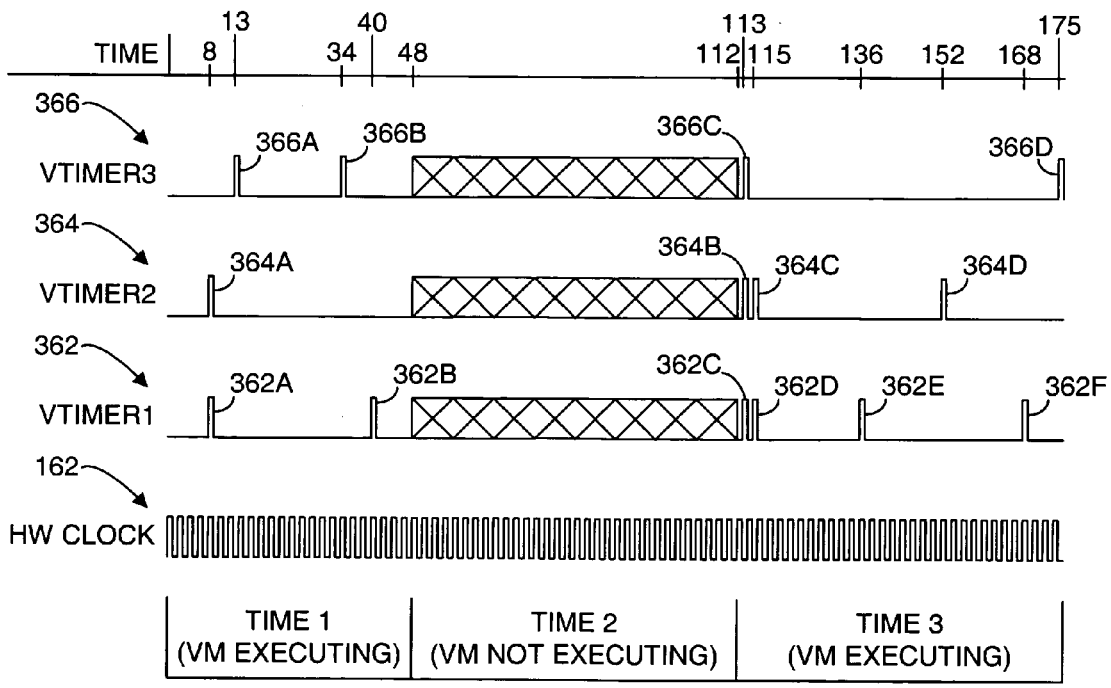
FIG. 3B is a timing diagram, illustrating the operation of a plurality of virtual timers within a virtual machine (VM), when the VM is not able to run continuously.

These time slices in which the VM 300 is not allowed to execute may create problems for the timer emulators 460 in their emulation of the virtual timers 360. An example of this type of situation is illustrated in FIG. 3B. As shown at the bottom of FIG. 3B, the VM 300 is executing during a first time slice (TIME 1) that extends from a time 0 to a time 48, the VM 300 is not executing during a second time slice (TIME 2) that extends from the time 48 to a time 112, and the VM 300 is executing again during a third time slice (TIME 3) that extends from the time 112 through a time 176. As also shown in FIG. 3B, the hardware clock 162 again operates without interruption, at a constant frequency.

During the second time slice, TIME 2, the VM 300 is not executing, so the virtual timers 360 cannot operate. Any timer events that would otherwise have occurred during the second time slice cannot occur during the second time slice in this scenario. FIG. 3B represents the same window of time for the operation of the VM 300 as is represented in FIG. 3A. The only difference between FIGS. 3A and 3B is that the VM 300 does not execute during the second time slice in FIG. 3B. As shown in FIG. 3B, the timer events 362A and 364A are still able to occur at the time 8, the timer event 366A is still able to occur at the time 13, the timer event 366B is still able to occur at the time 34, and the timer event 362B is still able to occur at the time 40, all during the first time slice, because the VM 300 is executing. However, the timer events 364B, 366C, 362C, 362D and 364C are not able to occur during the second time slice because the VM 300 is not executing. Instead, these timer events must generally be pushed back in time, so that they occur during the third time slice, instead. It is also generally desirable, however, that the virtual timers 360 not lag behind the real time of the physical computer system any longer than is necessary. Thus, FIG. 3B shows the timer events 362C, 364B, 366C, 362D and 364C occurring immediately after the third time slice begins, at substantially the same time. Specifically, the timer events 362C, 364B and 366C are all shown as occurring at a time 113, and the timer events 362D and 364C are shown as occurring at a time 115. The timer event 366D is shown to occur after the timer event 366C, with the same interval as is shown in FIG. 3A, namely an interval of 62 units of time. Thus, the timer event 366D is shown to occur at a time 175. This is because the third timer 366 is used as a one-shot timer, and it presumably wouldn't have been reprogrammed to generate the fourth timer event 366D until after it generates the third timer event 366C at the time 113. The fifth timer event 366E is delayed in the scenario of FIG. 3B to the point that it does not even appear in the timing diagram. The timer events 362E, 364D and 362F are shown to occur at the same times in FIGS. 3A and 3B.

Now the relative timing of some of the timer events in FIG. 3B is substantially different from the relative timing of the same timer events in FIG. 3A. In FIG. 3B, the timer event 364B no longer occurs before the timer event 366C, the timer event 366C no longer occurs before the timer event 362C, and the timer event 366D no longer occurs before the timer event 362E. Also, the relative intervals between several of the timing events has changed dramatically. For example, the time interval between the timer events 362C and 362D is now 2 units of time, instead of 32 units of time; the time interval between the timer events 364B and 364C is also now 2 units of time, instead of 48 units of time; the time interval between the timer events 362D and 362E is now 21 units of time, instead of 32 units of time; and the time interval between the timer events 364C and 364D is now 37 units of time, instead of 48 units of time.

If the guest software in the VM 300 is dependent on the relative timing of the multiple virtual timers 360, then the guest software may execute correctly in the scenario of FIG. 3A, but it may not execute correctly in the scenario of FIG. 3B. Part or all of the guest software may crash, or it may not operate the same as it would if it were operating on a comparable physical computer system. In particular, SMP Linux generally would not operate properly in a virtual computer system that exhibited the timing characteristics illustrated in FIG. 3B. In addition, because the timer events 362C, 364B, 366C, 362D and 364C occur at substantially the same time in the scenario of FIG. 3B, the guest software in the VM 300 may not recognize each of these timer events as a distinct event, which may also cause the guest software to malfunction. This invention provides a more consistent and accurate emulation of multiple virtual timers, such as the virtual timers 360, when the VM to which the virtual timers are exported does not execute continuously, or when, for some other reason, the timing of the virtual timers falls behind the real timing of the physical computer system.

Figure 4:
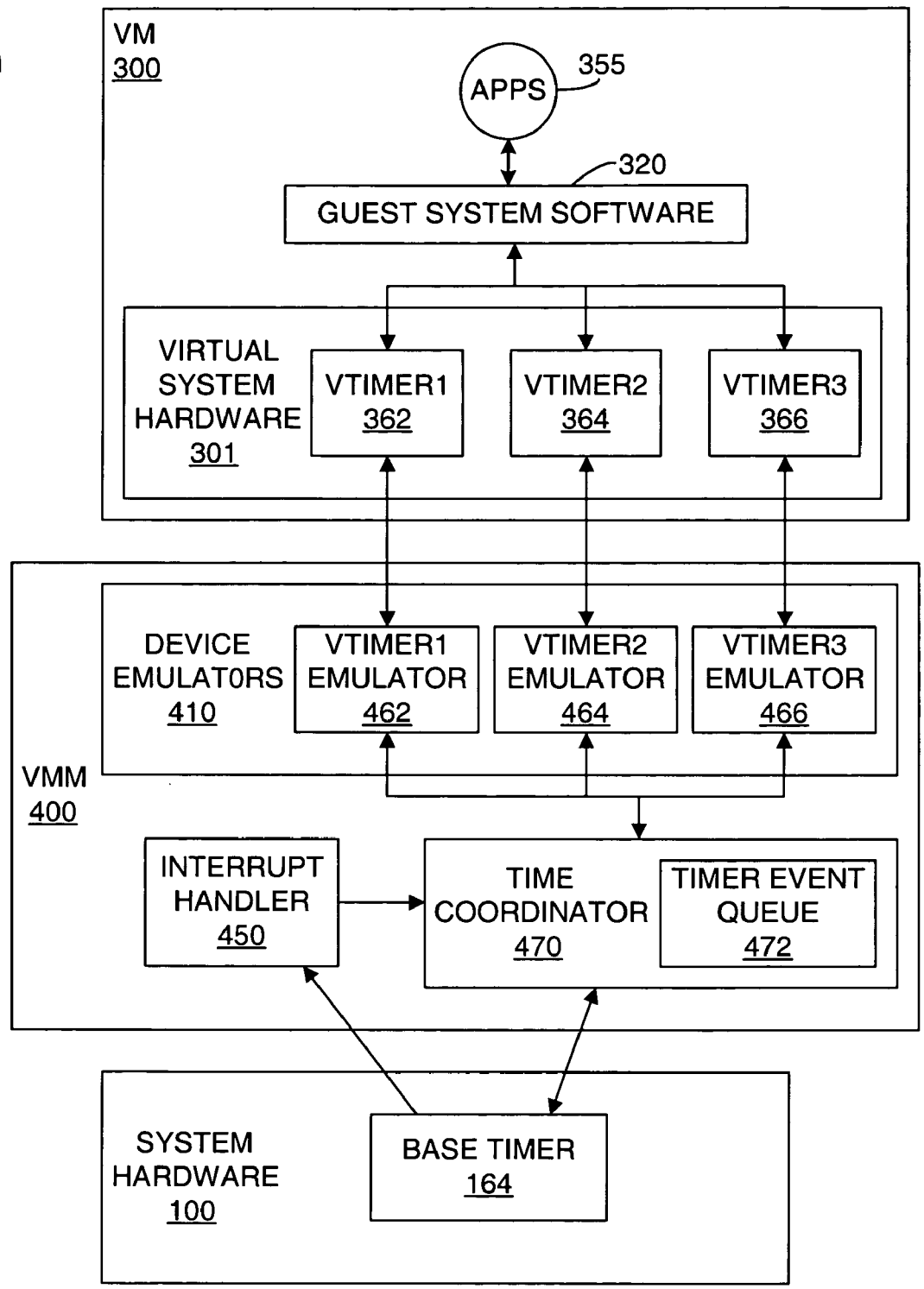
FIG. 4 is a functional block diagram illustrating an implementation of this invention in a virtual computer system.

This invention may be implemented in the virtual computer system 10 illustrated in FIG. 1. FIG. 4 is a functional block diagram illustrating the main components of one implementation of this invention in the virtual computer system 10. FIG. 4 shows the system hardware 100, including a base timer 164. The base timer 164 represents the primary timer that is used to keep track of the real, uninterrupted time of the virtual computer system 10. The base timer 164 may be, for example, the timer within the system hardware 100 that is normally used as a timestamp clock.

FIG. 4 also shows the VM 300, including the virtual system hardware 301, the guest system software 320 and the guest applications 355. The virtual system hardware 301 includes three virtual timers 360 (shown in FIG. 1), namely a first virtual timer (VTIMER1) 362, a second virtual timer (VTIMER2) 364 and a third virtual timer (VTIMER3) 366. The virtual timers 360 may be substantially the same as described above, except as specifically indicated below. Thus, the virtual timers 360 may generate timer events, such as those illustrated in FIGS. 3A and 3B. As described above, such timer events may comprise, for example, timer interrupts that are raised in the VM 300.

FIG. 4 also shows the VMM 400, including the device emulators 410 and the interrupt handler 450. The device emulators 410 include three timer emulators 460 (shown in FIG. 1), namely a first timer emulator 462, a second timer emulator 464 and a third timer emulator 466. The first timer emulator 462 emulates the first virtual timer 362, the second timer emulator 464 emulates the second virtual timer 364, and the third timer emulator 466 emulates the third virtual timer 366. Other arrangements for the timer emulators 460 are also possible. For example, a single timer emulator 460 may emulate all of the virtual timers 360.

The VMM 400 also includes a time coordinator 470. The time coordinator 470 keeps track of an "apparent time." This apparent time represents the amount of time that appears to have passed from the perspective of the guest software within the VM 300, based on timer events generated by the virtual timers 360 and based on any occasions when the guest software reads a count from one of the virtual timers 360. The apparent time is preferably kept in the same units of time as are provided to the VM 300 for the virtual timer 360 having the finest resolution. Often this virtual timer 360 represents a timestamp counter (TSC). The time coordinator 470 coordinates the activities of the timer emulators 460 to ensure that the timer events and the timer counts presented to the VM 300 by the timer emulators 460 are consistent with the apparent time and with each other. The coordination provided by the time coordinator 470 also ensures that the average running rate of each of the virtual timers 360 is approximately the same as real time. The operation of the timer emulators 460 and the time coordinator 470 are described in greater detail below with reference to FIGS. 5A and 5B. The time coordinator 470 also includes a timer event queue 472, which is also illustrated in FIG. 4, and which is described below in connection with FIGS. 6A to 6E.

Figure 5A:
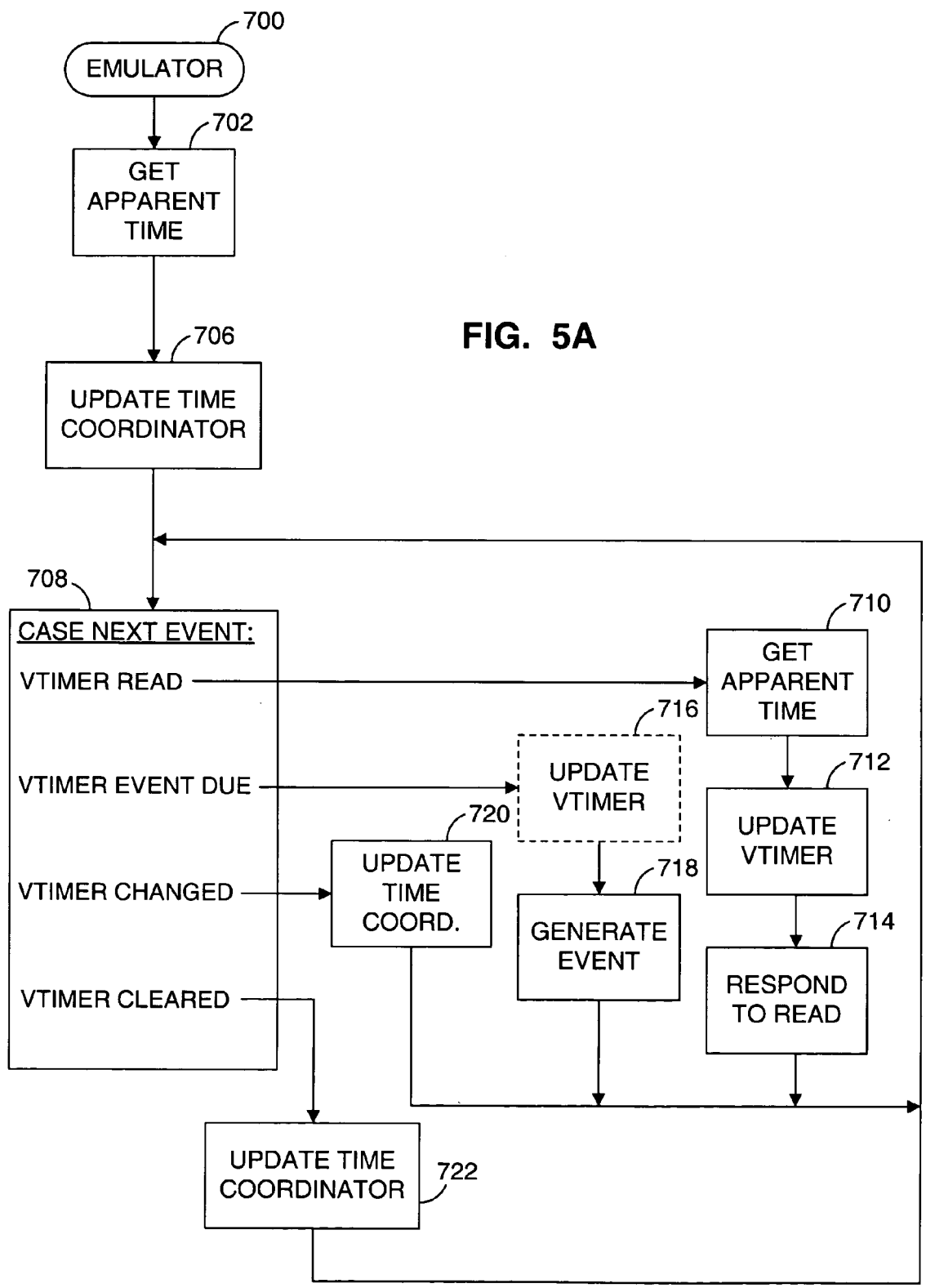
FIG. 5A is a flow chart illustrating a method that may be performed by a timer emulator in an implementation of this invention.

FIG. 5A is a flow chart illustrating a method that may be performed by each of the timer emulators 460 when emulating the respective timers 360 to keep their respective timers consistent with apparent time, and, consequently, to keep the multiple timers 360 consistent with each other. Thus, the timer emulator 462 performs the method of FIG. 5A when emulating the virtual timer 362, the timer emulator 464 performs the method of FIG. 5A when emulating the virtual timer 364 and the timer emulator 466 performs the method of FIG. 5A when emulating the virtual timer 366. The method of FIG. 5A will be described in terms of the timer emulator 462 and the virtual timer 362, although it also applies to the other timer emulators 464 and 466 and virtual timers 364 and 366.

The method of FIG. 5A begins at an initial step 700. Next, at a step 702, when the timer emulator 462 is initially started, such as at power up, the timer emulator 462 retrieves a current apparent time from the time coordinator 470. Any of the timer emulators 460 may preferably retrieve a current apparent time from the time coordinator 470 at any time. The timer emulators 460 should generally retrieve a current apparent time whenever the guest software attempts to read or write a register for the respective virtual timers 360. In the preferred embodiment, each of the timer emulators 460 is responsible for converting between apparent time and the appropriate counter values that are needed for emulating the respective virtual timers 360.

Next, at a step 706, the timer emulator 462 notifies the time coordinator 470 that the virtual timer 362 has been set to its initial state, and the timer emulator 462 provides parameters to the time coordinator 470, indicating how the virtual timer 362 has been set up. In particular, the timer emulator 462 indicates to the time coordinator 470 the apparent time at which the virtual timer 362 is to generate its next timer event, whether the virtual timer 362 has been set up as a periodic timer or as a one-shot timer, and, for a periodic timer, the period for the timer, in units of apparent time. In the preferred embodiment, the parameters that the timer emulator 462 provides to the time coordinator 470 are specified in terms of the apparent time, and not the units that are used by the virtual timer 362, although, in other embodiments, the units of the respective virtual timers 360 may be used. The timer emulators 460 may preferably determine the frequency at which the apparent time runs from the time coordinator 470, such as by calling a function of the time coordinator 470 that is provided for use by the timer emulators 460. Each timer emulator 460 may then use this frequency, along with the frequency at which its respective virtual timer 360 operates, to convert between units of apparent time and the units used by the respective virtual timer 360. Thus, for example, if the virtual timer 362 counts at a frequency that is one half as fast as the frequency of the apparent time, and the virtual timer 362 has been set up as a periodic timer having a specified period, then the timer emulator 462 informs the time coordinator 470 that the virtual timer 362 has been set up as a periodic timer, but the timer emulator 462 indicates a period for the virtual timer 362 that is twice as large as the final counter value that was specified for the timer 362 by the guest software.

After the step 706, the method of FIG. 5A proceeds to a step 708. At the step 708, the timer emulator 462 performs a step that is equivalent to a case statement in the C programming language. If the guest software attempts to read a counter value from the timer 362, then the method proceeds to a step 710. If the time coordinator 470 notifies the timer emulator 462 that a timer event is due for the timer 362, then the method proceeds to an optional step 716. If the guest software changes the setting for the timer 362, then the method proceeds to a step 720. If the guest software clears the timer 362, so that the timer is no longer set, then the method proceeds to a step 722. At the step 722, the timer emulator 462 indicates to the time coordinator 470 that the timer 362 has been cleared, so that the time coordinator 470 will not indicate any further timer events for the timer 362, until the timer 362 is set again later on. After the step 722, the method of FIG. 5A returns to the step 708.

At the step 710, in response to an attempt by the guest software to read the virtual timer 362, the timer emulator 462 retrieves a current apparent time from the time coordinator 470. Next, at a step 712, the timer emulator 462 updates the count of the virtual timer 362 based on the apparent time retrieved at the step 710. Again, the timer emulator 462 is responsible for converting the apparent time into a count value that is appropriate to the virtual timer 362. The timer emulator 462 will generally retain the apparent time from the previous time that the timer emulator 462 updated the count of the virtual timer 362 either at this step 712 or at the step 716. From a previous apparent time, as well as the frequencies at which the apparent time changes and the timer 362 counts, the timer emulator 462 can determine an appropriate count value for the timer 362. Generally, the appropriate count value is set to: Count=$(f_{VT}/f_{AT})*(AT_C-AT_R)$, where $f_{VT}$ is the frequency of operation of the virtual timer 362, $f_{AT}$ is the frequency at which the apparent time increases, $AT_C$ is the current apparent time retrieved at the step 710, and $AT_R$ is the apparent time that has been retained from the previous time that the timer emulator 462 updated the count of the virtual timer 362, or the apparent time from the step 702 if the timer emulator 462 has not yet updated the count of the virtual timer 362. Next, at a step 714, the timer emulator 462 provides the count value determined at the step 712 to the guest software in response to the attempted read of the virtual timer 362. After the step 714, the method of FIG. 5A returns to the step 708.

At the optional step 716, in response to a notification from the time coordinator 470 that a timer event is due at the timer 362, the timer emulator 462 updates the timer 362. If this step is performed, the timer emulator 462 generally updates the count value of the virtual timer 362 to its final count value, to indicate that the timer 362 has finished counting up to its final value. The timer emulator 462 can determine a current apparent time at this timer event, based on the period of the timer 362 in units of apparent time and based on the apparent time of the previous timer event for the timer 362, or the apparent time when the timer 362 was started, if this is the first timer event for the timer 362. The step 716 generally does not need to be performed, however, because the guest software typically will not read the count value of the timer 362 at this point because the timer event already indicates that the final count value has been reached. Also, if the guest reads the timer 362 in response to a timer event, the timer emulator 462 will update the timer 362 at the step 712 anyway. After the optional step 716, the method of FIG. 5A proceeds to a step 718. At this step, the timer emulator 462 generates a timer event to the guest software, as if it were generated by the virtual timer 362. For example, the timer emulator 462 may raise a timer interrupt to the guest OS 330. After the step 718, the method returns to the step 708.

At the step 720, in response to a change to the settings of the virtual timer 362 by the guest software, the timer emulator 462 notifies the time coordinator 470 that the settings of the virtual timer 362 have been changed, and the timer emulator 462 provides parameters to the time coordinator 470, indicating these new settings, such as the apparent time at which the next timer event is due to occur, whether or not the timer 362 is set up as a periodic timer, and, for a periodic timer, the period. This step 720 is similar to the step 706 described above, except that in this case, the timer emulator 462 only needs to provide to the time coordinator 470 any parameters that have changed. Again, the parameters that the timer emulator 462 provides to the time coordinator 470 are preferably specified in terms of the apparent time, and not the units that are used by the virtual timer 362. The timer emulator 462 may again retrieve a new current apparent time from the time coordinator 470. After the step 720, the method of FIG. 5A again returns to the step 708.

The method of FIG. 5A is performed by each of the timer emulators 460, as the timer emulators 460 are emulating their respective virtual timers 360. During the method of FIG. 5A, the timer emulators 460 notify the time coordinator 470 of how their respective virtual timers 360 are programmed by the guest software. The time coordinator 470 uses this information to coordinate the activities of the respective timer emulators 460 so that they are consistent with the apparent time that is tracked by the time coordinator 470. In particular, the time coordinator 470 indicates to each of the timer emulators 460 when they should generate timer events to the guest software, and the time coordinator 470 provides consistent apparent times to the timer emulators 460 whenever the guest software attempts to read the virtual timers 360, so that the timer emulators 460 can return count values to the guest software that are also consistent with the apparent time. Ensuring that the activities of each of the timer emulators 460 are consistent with the apparent time also ensures that the activities of the timer emulators 460 are consistent with each other. The time coordinator 470 further ensures that the apparent time is reasonably consistent with the real time of the physical computer system and that the apparent time is reasonably accurate relative to the real time.

Figure 5B:
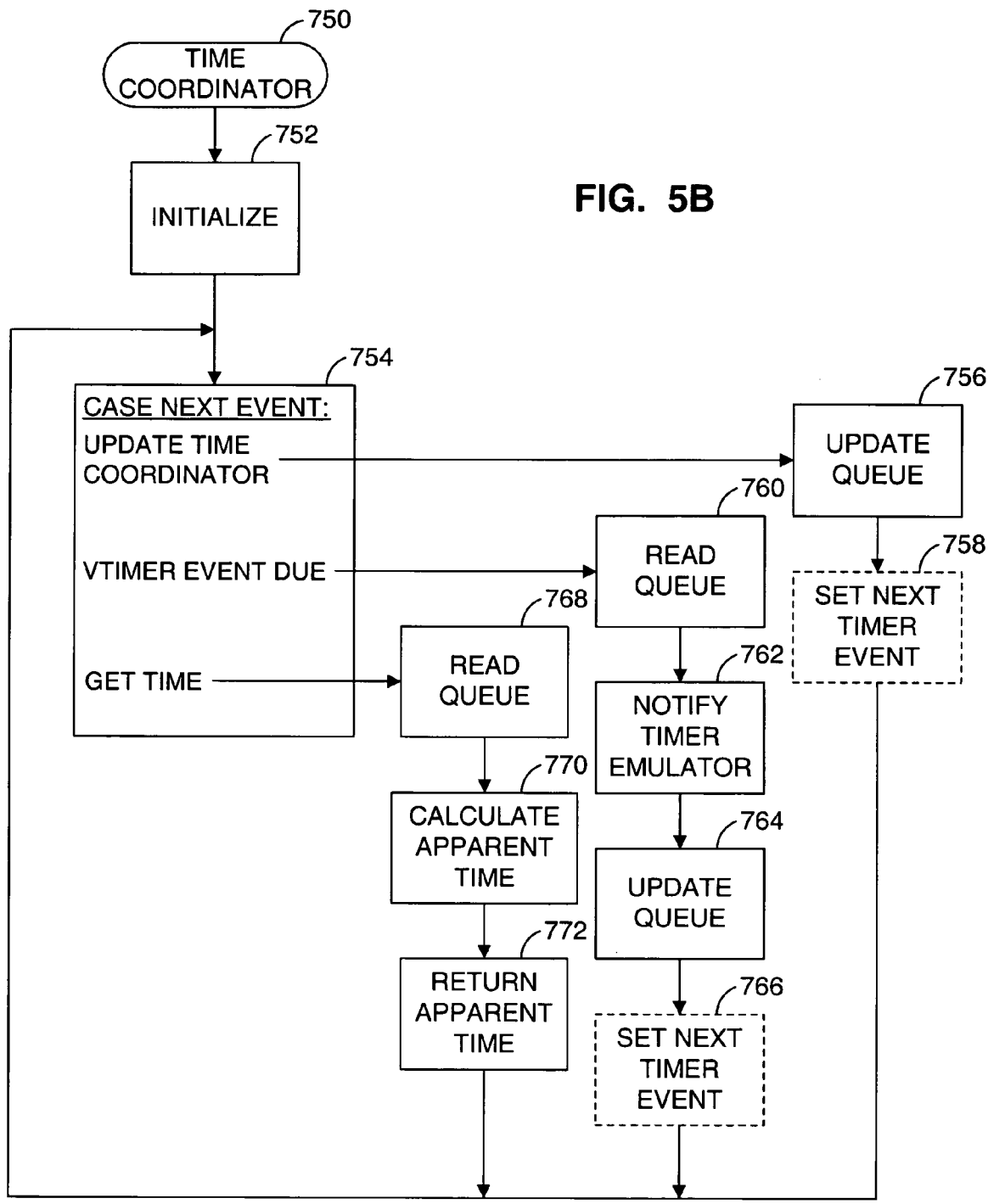
FIG. 5B is a flow chart illustrating a general method that may be performed by a time coordinator in an implementation of this invention.

FIG. 5B is a flow chart illustrating a method that may be performed by the time coordinator 470 to ensure that the activities of each of the timer emulators 460 are consistent with the apparent time. FIG. 5B begins at an initial step 750. Next, at a step 752, one or more initialization steps are performed by the time coordinator 470. The step 752 may be performed when the VM 300 is initially created, for example. These initialization steps will depend on the particular implementation of the virtual computer system 10. As examples of possible initialization steps, the time coordinator 470 may establish an initial apparent time, which may be derived from a real time that is determined from the physical computer system. The time coordinator 470 may also initialize various data structures, such as the timer event queue 472.

After the step 752, the method of FIG. 5B proceeds to a step 754. At the step 754, the time coordinator 470 performs a step that is equivalent to a case statement in the C programming language. If a timer emulator 460 updates the time coordinator 470, such as was described above at the steps 706, 720 and 722 of FIG. 5A, then the method of FIG. 5B proceeds to a step 756. If the time coordinator 470 determines that a timer event is due to occur at one of the virtual timers 360, then the method proceeds to a step 760. If a timer emulator 460 attempts to get a current apparent time from the time coordinator 470, such as was described above at the step 710 of FIG. 5A, then the method of FIG. 5B proceeds to a step 768.

Figure 5C:
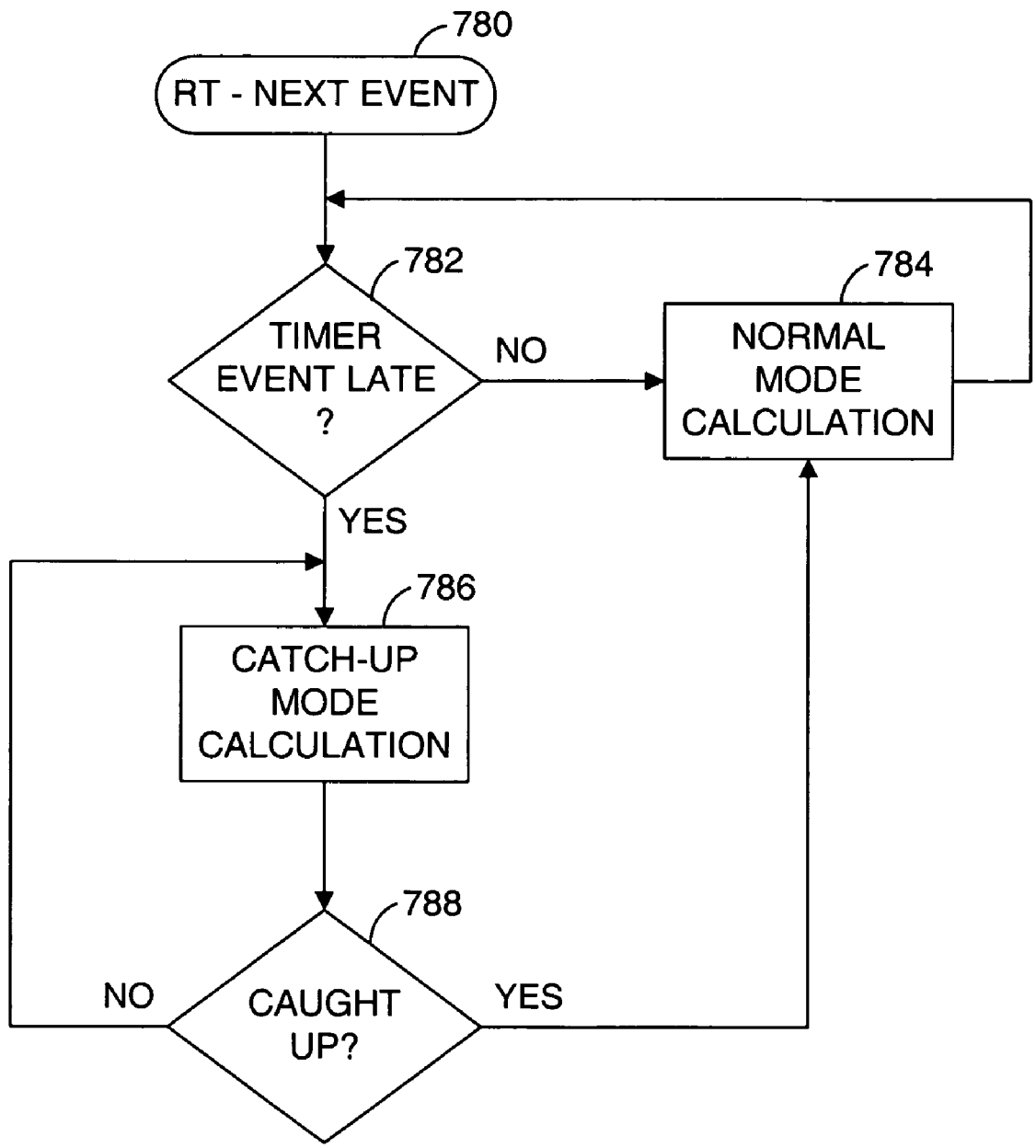
FIG. 5C is a flow chart illustrating a method that may be performed by a time coordinator to calculate an apparent time in an implementation of this invention.

At the step 754, the time coordinator 470 may determine that a timer event is due to occur at one of the virtual timers 360 in a variety of ways. First, the time coordinator 470 must convert an apparent time that indicates a time at which a timer event should occur into a corresponding real time. The apparent time will be received from a timer emulator 460 during an update of the time coordinator 470, or it will be calculated from parameters received from a timer emulator 460. Then, the time coordinator 470 performs a method, which is illustrated in FIG. 5C, for converting an apparent time for a timer event into a real time. The method of FIG. 5C is described below. Next, in one embodiment, the time coordinator 470 sets one or more hardware timers 160 to raise a timer interrupt or generate some other timer event at the real time corresponding to the timer event. The time coordinator 470 can then detect this timer event from the hardware timer 160 and conclude that a timer event is due at the respective virtual timer 360. For example, the time coordinator 470 may use the base timer 164 illustrated in FIG. 4 for this purpose. If the base timer 164 is set up to generate timer interrupts when timer events are due, the interrupt handler 450 may initially handle the timer interrupts and pass the timer interrupts on to the time coordinator 470, or otherwise notify the time coordinator 470 of the timer interrupts.

In another embodiment, however, the hardware timers 160 are not used as described immediately above. This other embodiment is actually embodied in a commercial product of the assignee of this invention. In that product, the time coordinator 470 may be viewed as comprising a first software routine referred to as a TimeTracker and a second software routine referred to as a MonitorPoll. The TimeTracker keeps track of apparent time and determines when, in real time, timer events for the virtual timers should occur. The TimeTracker also uses the method of FIG. 5C to convert an apparent time for a timer event into a real time. The TimeTracker then requests that the MonitorPoll notify the TimeTracker when the real time reaches the time at which the virtual timer event should occur. The MonitorPoll runs rather frequently and consistently in that embodiment and performs several tasks within the virtual computer system. One of the tasks performed by the MonitorPoll is to continually poll a real time counter, such as the base timer 164 shown in FIG. 4, and notify the TimeTracker when a requested real time comes about. Thus, the MonitorPoll notifies the TimeTracker that a virtual timer event is due when it notices that the real time for the virtual timer event has arrived.

In the preferred embodiment, the time coordinator 470 only monitors when the next virtual timer event is due to occur, such as by setting a single hardware timer 160 or by notifying the MonitorPoll or another software routine of a real time for only a single timer event. When that timer event is generated, then the time coordinator 470 moves on to monitor when the following virtual timer event is due to occur. In other embodiments, the time coordinator 470 may monitor multiple virtual timer events simultaneously, such as by setting multiple hardware timers 160 for the respective timer events or by notifying the MonitorPoll or another software routine of multiple upcoming timer events. The description below assumes the preferred technique of monitoring only a single timer event at a time, although it may be adapted by a person of skill in the art to apply to a technique in which multiple timer events are monitored simultaneously. Returning to the method of FIG. 5B, at the step 756, in response to an update of the time coordinator 470 by one of the timer emulators 462, the time coordinator 470 updates the timer event queue 472. The timer event queue 472 is illustrated in each of the FIGS. 6A to 6E, and the data in the queue 472 differs in each figure. The timer event queue 472 has a different entry for each virtual timer 360 that is currently set to generate a timer event. In each of the FIGS. 6A to 6E, the timer event queue 472 has three different entries, indicating that each of the virtual timers 360 is set up to generate a timer event in each case. A first column 474 in the queue 472 indicates the virtual timer 360 to which a queue entry relates. Thus, as shown in FIG. 6A, a field 474A indicates that a first entry in the queue 472 relates to the VTIMER2 364; a field 474B indicates that a second entry in the queue 472 relates to the VTIMER3 366; and a field 474C indicates that a third entry in the queue 472 relates to the VTIMER1 362. A second column 476 in the queue 472 indicates the apparent time at which the next timer event is due for the respective virtual timer 360. Thus, as shown in FIG. 6A, a field 476A indicates that the next timer event for the VTIMER2 364 is due to occur at an apparent time value of 56; a field 476B indicates that the next timer event for the VTIMER3 366 is due to occur at an apparent time value of 62; and a field 476C indicates that the next timer event for the VTIMER1 362 is due to occur at an apparent time value of 72. A third column 478 in the queue 472 indicates whether the respective virtual timer 360 is set up as a periodic timer or a one-shot timer. Thus, as shown in FIG. 6A, a field 478A indicates that the VTIMER2 364 is set up as a periodic timer; a field 478B indicates that the VTIMER3 366 is set up as a one-shot timer, instead of as a periodic timer; and a field 478C indicates that the VTIMER1 362 is set up as a periodic timer. A fourth column 480 indicates the period for the respective virtual timer 360 in units of apparent time, if the respective virtual timer 360 is set up as a periodic timer. Thus, as shown in FIG. 6A, a field 480A indicates that the VTIMER2 364 has been set up with a period of 48 units of time in apparent time; a field 480B does not indicate a period for the VTIMER3 366 because the VTIMER3 366 has been set up as a one-shot timer, instead of as a periodic timer; and a field 480C indicates that the VTIMER1 362 has been set up with a period of 32 units of time in apparent time. Thus, at the step 756 of FIG. 5B, the time coordinator 470 fills in, or modifies, an entry in the queue 472, based on the parameters provided by one of the timer emulators 460. The third column 478 may be combined with the fourth column 480, for example by eliminating the third column 478 and using a value of zero in the fourth column 480 to indicate a one-shot timer, and any non-zero value to indicate a periodic timer.

The entries in the queue 472 are preferably maintained in the order in which the respective timer events are due to occur. Thus, as shown in FIG. 6A, the entry for the VTIMER2 364 occurs first in the queue 472 because its timer event is due to occur first, at the apparent time 56; the entry for the VTIMER3 366 occurs second in the queue 472 because its timer event is due to occur second, at the apparent time 62; and the entry for the VTIMER1 362 occurs third in the queue 472 because its timer event is due to occur third, at the apparent time 72. In the preferred embodiment, the queue 472 is actually maintained as a linked list. Using a linked list, when the ordering of the next timer events for the respective virtual timers 360 changes, the ordering of the queue entries may be changed simply by modifying the linking information. Otherwise, if the queue 472 were implemented as an array, for example, all of the data for one or more of the queue entries would have to be moved to new locations each time the ordering of the queue is changed.

After the step 756, the method of FIG. 5B proceeds to an optional step 758. The conditions under which the step 758 may be performed are described below, beginning at the next paragraph. Now, at the optional step 758, if it is performed, the time coordinator 470 takes whatever action is necessary to try to ensure that the time coordinator 470 notices when the next virtual timer event should occur. In an embodiment in which the time coordinator 470 sets a hardware timer 160 to determine when the next timer event is due, the time coordinator 470 may set the hardware timer 160 at this step 758 to generate a timer interrupt at a real time that corresponds to the apparent time at which the next timer event is due to occur. In an embodiment in which the time coordinator 470 relies on the MonitorPoll or some other software entity, instead of a hardware timer 160, the time coordinator 470 may notify the other software entity at this step 758 of the real time that corresponds to the apparent time at which the next timer event is due to occur. As mentioned above, the apparent time for the next timer event may be determined from information received from one of the device emulators 460, and the real time corresponding to this apparent time may be determined according to a method illustrated in FIG. 5C.

In the preferred embodiment, in which the time coordinator 470 only monitors a single virtual timer event at a time, the time coordinator 470 performs the step 758 only if the real time at which the next timer event is due to occur has changed as a result of the update provided by the timer emulator 460. Thus, the step 758 is performed only if the timer event represented by the first entry in the queue 472 has changed. This situation can arise (1) if the first entry in the queue 472 is modified to change the apparent time at which the corresponding timer event is due to occur, or (2) if another entry in the queue 472 is modified in a manner that makes that queue entry become the first entry. For example, if the queue 472 has the contents illustrated in FIG. 6A, and the timer emulator 462 updates the time coordinator 470 to indicate that the next timer event for the VTIMER1 362 should occur at an apparent time value of 51, for example if the guest software changed the virtual timer 362 in a corresponding manner, then this timer event for the VTIMER1 362 becomes the next timer event. In this case, the entry in the queue 472 for the VTIMER1 362 is moved to be the first entry in the queue, and the step 758 is performed to indicate that the next timer event is now to occur at the real time value that corresponds with the apparent time value of 51, instead of at the real time value that corresponds with the apparent time value of 56. After the step 758, the method of FIG. 5B returns to the step 754. At the step 760, in response to a determination that a virtual timer event is due to occur, the time coordinator 760 reads the first entry in the queue 472 to determine the virtual timer 360 for which a timer event is due. Thus, if the queue 472 has the contents illustrated in FIG. 6A, the time coordinator 470 determines that the VTIMER2 364 has a timer event due. The time coordinator 470 preferably also compares the apparent time in the field 476A with the apparent time in subsequent entries of the queue 472. If subsequent queue entries have the same apparent time, then those queue entries also represent timer events that are due at this time. Next, at a step 762, the time coordinator 470 notifies the timer emulator 460 that corresponds with the virtual timer 360 determined in the step 760 that a timer event is due. In the preferred embodiment, each timer emulator 460 provides a function for use by the time coordinator 470, which is used for notifying the timer emulator 460 of a timer event. Thus, in the case of FIG. 6A, the time coordinator 470 notifies the timer emulator 464 that a timer event is due on the virtual timer 364. After the step 762, the method of FIG. 5B proceeds to a step 764. At this step, the time coordinator 470 updates the queue 472. Generally, the time coordinator 470 updates the queue entry for the virtual timer 360 for which the timer event is now due to indicate when the next timer event for that timer is due, if there is any such next timer event scheduled. For a timer that is set up as a periodic timer, this is achieved by adding the period of the timer from the column 480 to the apparent time in the column 476. For a one-shot timer, the queue entry is generally cleared or deleted from the queue 472. Thus, in FIG. 6A, the queue entry for the VTIMER2 364 is modified to indicate that the next timer event for that timer is due to occur at an apparent time of 104 (56 (from field 476A)+48 (from field 480A)). Thus, specifically, a value of 104 is written to the field 476A. At the step 764, the time coordinator 470 also updates the ordering of the entries in the queue 472, as needed. Thus, in the case of FIG. 6A, the queue 472 is reordered as shown in FIG. 6B. Next, at a step 766, the time coordinator 470 may set the next timer event in a manner that is similar to the step 758. If there is any other pending virtual timer event, the step 766 will be performed, based on the first entry in the queue 472. The next timer event will be set to occur at the real time corresponding to the apparent time in the field 476A of the queue 472. Again, this real time is determined according to the method of FIG. 5C. After the step 766, the method of FIG. 5B returns to the step 754.

At the step 768, in response to a timer emulator 460 retrieving a current apparent time from the time coordinator 470, the time coordinator 470 again reads the first entry of the queue 472. In particular, the time coordinator 470 reads the apparent time value in the field 476A to determine the apparent time at which the next timer event is due to occur. Next, at a step 770, the time coordinator 470 determines an apparent time that can be used for this instant of time. For example, if the guest software attempted to read the virtual timer 362, the time coordinator 470 determines an apparent time that is to be presented to the guest software. The time coordinator 470 returns this apparent time to the timer emulator 462, which then provides a corresponding counter value for the timer 362 to the guest software. The time coordinator 470 determines a current apparent time that falls between (1) the latter to occur of (a) the apparent time at which the most recent previous timer event occurred and (b) the apparent time which was most recently used in response to the guest software reading a counter value from one of the virtual timers 360 and (2) the apparent time at which the next timer event is due to occur. A "time incident" is defined herein to mean any occurrence that provides timing information to the guest software running in the VM 300, such as a timer event or a reading of a virtual timer. Using this definition, the time coordinator 470 determines a current apparent time that falls between the apparent time at which the most recent previous time incident occurred and the apparent time at which the next timer event is due to occur. For example, the time coordinator 470 may determine the current apparent time according to the following equation:

$$AT_C = AT_L + ((RT_C - RT_L)/(RT_N - RT_L)) * (AT_N - AT_L),$$

where $AT_C$ is the current apparent time and $RT_C$ is the current real time; $AT_L$ is the latest apparent time that has been presented to the guest software either through the generation of a timer event or in response to the guest software reading a count value from a virtual timer 360; $RT_L$ is the actual real time at which the apparent time $AT_L$ was presented to the guest software; and $AT_N$ and $RT_N$ are the apparent time and the real time, respectively, at which the next timer event is due to occur. The time coordinator 470 may check a hardware timer 160 to determine the current real time, and it may keep track of all the other values required to solve the equation from prior determinations. After the step 770, the method of FIG. 5B proceeds to a step 772. At this step, the time coordinator 470 returns the apparent time determined at the step 770 to the timer emulator 462. After the step 772, the method of FIG. 5B returns to the step 754.

As mentioned above, FIG. 5C illustrates a method that may be used by the time coordinator 470 to determine a real time at which the next timer event should occur. This method may be performed during the steps 758 and 766 of FIG. 5B when setting the next timer event. The time coordinator 470 retains both the apparent time and the real time at which the most recent previous timer event occurred, as well as the real time at which the most recent previous timer event was supposed to occur. The apparent time at which the next timer event is to occur can be determined by reference to the field 476A of the timer event queue 472. For the following discussion, $AT_P$ represents the apparent time at which the most recent previous timer event occurred; $AT_N$ and $RT_N$ represent the apparent time and the real time, respectively, at which the next timer event is due to occur; $NRT_P$ represents the real time at which the most recent previous timer event normally would have occurred if the timer events were not delayed; $ART_P$ represents the actual real time at which the most recent previous timer event occurred; and $RT_C$ represents the current real time. The following discussion assumes that the resolution of the apparent time is the same as the resolution of the real time. A person of skill in the art may add appropriate factors to equations defined below to compensate for any difference in the resolutions of the apparent time and the real time.

The method of FIG. 5C begins at an initial step 780. At this point, the time coordinator 470 is in a normal mode of operation in terms of determining when timer events should occur and in terms of determining apparent times that should be presented to the guest software. Next, the method of FIG. 5C proceeds to a step 782. At this step, the time coordinator 470 determines whether the real time at which the next timer event would normally occur has already passed. The time coordinator 470 may make this determination by determining whether the following condition is true: $RT_C > NRT_P + (AT_N - AT_P)$. Thus, for example, if the current real time is 113, the real time of the previous timer event would normally have been 40, the apparent time of the next timer event is 56 and the apparent time of the previous timer event was 40, the condition is true. If this condition is determined to be true, so that the real time at which the next timer event would normally occur has already passed, then the method of FIG. 5C proceeds to a step 786; otherwise, the method proceeds to a step 784.

At the step 784, the time coordinator 470 determines the real time at which the next timer event should occur according to the normal mode of operation. Specifically, the time coordinator 470 calculates this real time value according to the following equation: $RT_N=NRT_P+(AT_N-AT_P)$. Thus, for example, if the real time at which the previous timer event would normally have occurred is 34, the apparent time of the next timer event is 40 and the apparent time of the previous timer event was 34, then the real time at which the next timer event should occur is 40. After the step 784, the method of FIG. 5C returns to the step 782.

When the method of FIG. 5C proceeds to the step 786, the method is entering a "catch-up" mode of operation in terms of determining when timer events should occur and in terms of determining apparent times that should be presented to the guest software. At the step 786, the time coordinator 470 determines the real time at which the next timer event should occur according to the catch-up mode of operation. Specifically, the time coordinator 470 may calculate this real time value according to the following equation: $RT_N=ART_P+(1/C)*(AT_N-AT_P)$, where C is a constant value that may be determined based on a variety of factors, including possibly the characteristics of the virtual computer system 10 and the particular guest software that is to be run in the VM 300, for example. Thus, for example, if the real time at which the previous timer event actually occurred was 113, the apparent time of the next timer event is 62, the apparent time of the previous timer event was 56, and the constant C has the value 2, then the real time at which the next timer event should occur is 116. In a commercial product of the assignee of this invention, the constant C has been selected to be 3. In other embodiments of this invention, other values may be used for the constant C, or other equations may be used to calculate the real time for the next timer event when in this catch-up mode of operation. For example, the factor by which the time coordinator 470 causes the apparent time to catch up to the real time may vary depending on how far behind the apparent time is. As the apparent time catches up to the real time, the apparent time could decelerate relative to the real time. The rate at which the apparent time catches up with the real time can also vary depending on a wide variety of other factors, such as the particular guest software that is running in the VM 300 at a particular time or in general. Also, the rate at which the apparent time catches up with the real time can be set by a user, or it can be determined based on a formula or based on parameters provided by a user.

After the step 786, the method of FIG. 5C proceeds to a step 788. At this step, the time coordinator 470 determines whether the apparent time has caught up to the real time. The time coordinator 470 may make this determination by determining whether the following condition is true: $AT_N>=ART_P+(1/C)*(AT_N-AT_P)$. Thus, for example, if the actual real time of the previous timer event was 169, the apparent time of the next timer event is 172, the apparent time of the previous timer event was 168, and the constant C has a value of 2, the condition is true. If this condition is determined to be true, so that the apparent time has caught up to the real time, then the method of FIG. 5C returns to the normal mode of operation by returning to the step 784; otherwise, the method remains in the catch-up mode of operation by returning to the step 786.

Figure 7:
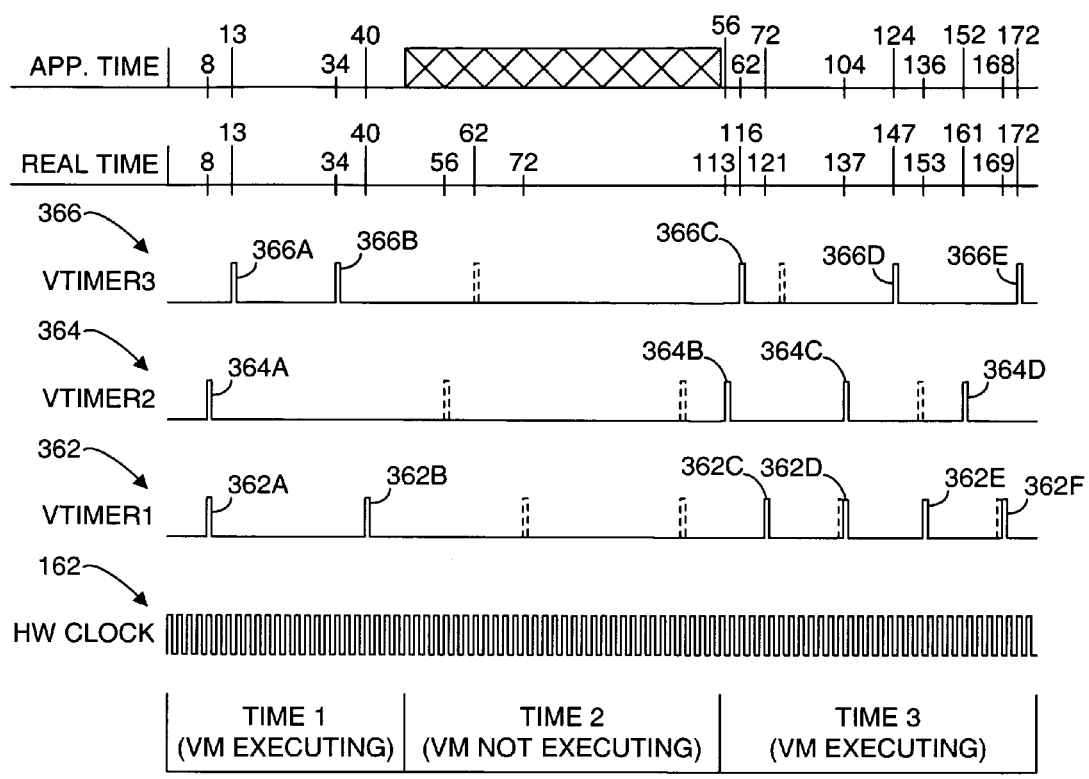
FIG. 7 is a timing diagram, illustrating the operation of a plurality of virtual timers within a virtual machine (VM) according to one implementation of this invention.

FIG. 7 shows the same situation as FIG. 3B, except that the timer events are now generated according to the present invention, using the equations defined above and using a constant value C of 2. As shown at the bottom of FIG. 7, the VM 300 is again executing during a first time slice (TIME 1) that extends from a time 0 to a time 48, the VM 300 is not executing during a second time slice (TIME 2) that extends from the time 48 to a time 112, and the VM 300 is executing again during a third time slice (TIME 3) that extends from the time 112 through a time 176. As also shown in FIG. 7, the hardware clock 162 again operates without interruption, at a constant frequency.

During the second time slice, TIME 2, the VM 300 is not executing, so the virtual timers 360 again cannot operate. Any timer events that would otherwise have occurred during the second time slice cannot occur during the second time slice in this scenario. FIG. 7 also represents the same window of time for the operation of the VM 300 as is represented in FIGS. 3A and 3B. The only difference between FIG. 3B and FIG. 7 is that the timing of the timer events in FIG. 7 is determined according to this invention, with the equations defined above and with a constant value C of 2. As shown in FIG. 7, the timer events 362A and 364A are still able to occur at the real time 8, the timer event 366A is still able to occur at the real time 13, the timer event 366B is still able to occur at the real time 34, and the timer event 362B is still able to occur at the real time 40, all during the first time slice, because the VM 300 is executing. During this first time slice, the time coordinator 470 is operating in the normal mode of operation. Thus, for example, in determining the real time at which the timer event 366A should occur, the time coordinator 470 plugs the following values: $NRT_P=8$, $AT_N=13$ and $AT_P=8$, into the following equation: $RT_N=NRT_P+(AT_N-AT_P)$, to determine a value of $RT_N=13$. Similarly, in determining the real time at which the timer event 366B should occur, the time coordinator 470 plugs the following values: $NRT_P=13$, $AT_N=34$ and $AT_P=13$, into the same equation, to determine a value of $RT_N=34$. Also, in determining the real time at which the timer event 362B should occur, the time coordinator 470 plugs the following values: $NRT_P=34$, $AT_N=40$ and $AT_P=34$, into the same equation, to determine a value of $RT_N=40$. For each of these timer events 362A, 364A, 366A, 366B and 362B, the real time at which the timer event normally would have occurred matches the real time at which the timer event actually did occur, which also matches the apparent time at which the timer event occurred. In the example of FIG. 7, the apparent time matches the real time when the apparent time is "caught up" to the real time. However, in a typical implementation, there will be a constant offset between the apparent time and the real time when the apparent time is caught up to the real time.

As described above, the time coordinator 470 executes the method of FIG. 5B to coordinate the activities of the timer emulators 460. Suppose that the real time is currently at the value of 40. At this point, the time coordinator 470 determines that a timer event is due to occur. As shown at the step 754 of FIG. 5B, the method then proceeds to the step 760. At the step 760, the time coordinator 470 reads the field 474A of the timer event queue 472 to determine the virtual timer 362 for which a timer event is due to occur. At this time, the field 474A will identify the VTIMER1 362, and the time coordinator 470 determines that the timer 362 is due for a timer event. Accordingly, at the step 762, the time coordinator 470 notifies the timer emulator 462 that a timer event is due. As also described above, the timer emulator 462 executes the method of FIG. 5A. In response to the notification from the time coordinator 470, the timer emulator 462 proceeds to the optional step 716. The timer emulator 462 may update the VTIMER1 362 at the step 716, and then the timer emulator 462 generates the timer event 362B at the step 718. After the time coordinator 470 completes the step 762, the time coordinator 470 proceeds to update the queue 472 at the step 764. Specifically, the time coordinator 470 adds the value in the field 480A, which would be a 32, to the value in the field 476A, which would be a 40, to determine that the next timer event 362C for the TIMER1 362 should occur at an apparent time of 72. This timer event 362C occurs after the next timer event 364B for the VTIMER2 364 and after the next timer event 366C for the VTIMER3 366. Thus, at the step 764, the time coordinator 470 also changes the ordering of the queue 472 so that the first entry represents the timer event 364B, the second entry represents the timer event 366C and the third entry represents the timer event 362C. At this point, the queue 472 appears as illustrated in FIG. 6A. The first entry comprises the fields 474A, 476A, 478A and 480A, containing the values VTIMER2, 56, Yes and 48, respectively; the second entry comprises the fields 474B, 476B, 478B and 480B, containing the values VTIMER3, 62, No and nothing, respectively; and the third entry comprises the fields 474C, 476C, 478C and 480C, containing the values VTIMER1, 72, Yes and 32, respectively.

Next, after the step 764, the time coordinator 470 proceeds to the step 766. At this point, the time coordinator 470 performs the method of FIG. 5C to determine the real time at which the next timer event 364B is to occur. The method of FIG. 5C is still in the normal mode of operation. Accordingly, the timer coordinator 470 performs the step 782 to determine if the method should remain in the normal mode of operation, or if the method should move into the catch-up mode of operation. Thus, the time coordinator applies the following condition: $RT_C > NRT_P + (AT_N - AT_P)$, using the following values: $RT_C=40$, $NRT_P=40$, $AT_N=56$, and $AT_P=40$, to determine that the method should remain in the normal mode of operation. Thus, the time coordinator applies the following equation: $RT_N = NRT_P + (AT_N - AT_P)$, using the same values, to determine that the real time for the next timer event should be 56. Thus, at the step 766, the time coordinator 470 takes appropriate steps to try to ensure that it notices when the real time reaches the value of 56. However, the VM 300 is not allowed to execute during the entire time slice of TIME 2, which includes the real time value of 56.

When the VM 300 is allowed to execute again, beginning at the real time value of 113, the time coordinator 470 notices that the real time value 56 has already passed. In response, the time coordinator 470 proceeds again to the step 760 to process the next case of a timer event coming due. At the step 760, the time coordinator 470 determines that the timer event 364B is due to occur on the timer 364. At the step 762, the time coordinator 470 notifies the timer emulator 464, which generates the timer event 364B. At the step 764, the time coordinator 470 updates the queue 472. Now, the queue 472 will have the contents illustrated in FIG. 6B, with the entry for the VTIMER2 364 updated to indicate its next timer event 364C occurring at an apparent time of 104, and with the ordering of the queue entries updated. Specifically, the first entry comprises the fields 474A, 476A, 478A and 480A, containing the values VTIMER3, 62, No and nothing, respectively; the second entry comprises the fields 474B, 476B, 478B and 480B, containing the values VTIMER1, 72, Yes and 32, respectively; and the third entry comprises the fields 474C, 476C, 478C and 480C, containing the values VTIMER2, 104, Yes and 48, respectively.

Again, at the step 766, the method of FIG. 5C is still in the normal mode of operation. However, this time, when the time coordinator applies the condition: $RT_C > NRT_P + (AT_N - AT_P)$, using the values: $RT_C=113$, $NRT_P=56$, $AT_N=62$, and $AT_P=56$, the time coordinator 470 determines that the method of FIG. 5C should go into the catch-up mode, beginning at the step 786. Thus, the time coordinator 470 applies the equation: $RT_N = ART_P + (1/C)*(AT_N - AT_P)$, using the values: $ART_P=113$, $C=2$, $AT_N=62$, and $AT_P=56$, to determine a value for $RT_N$ of 116. Thus, the time coordinator 470 sets the next timer event 366C to occur at the real time of 116.

At the real time 116, the time coordinator 470 notifies the timer emulator 466 of the timer event 366C at the step 762, and it updates the queue 472 at the step 764. This time, because the timer 366 is a one-shot timer, the first entry in the queue 472 is cleared, and the second and third entries in the queue 472 are each moved up by one entry. When the guest software sets up the timer 366 again, the queue 472 is updated to the state illustrated in FIG. 6C. Specifically, the first entry comprises the fields 474A, 476A, 478A and 480A, containing the values VTIMER1, 72, Yes and 32, respectively; the second entry comprises the fields 474B, 476B, 478B and 480B, containing the values VTIMER2, 104, Yes and 48, respectively; and the third entry comprises the fields 474C, 476C, 478C and 480C, containing the values VTIMER3, 124, No and nothing, respectively. This time, at the step 766 of FIG. 5B, the method of FIG. 5C is in the catch-up mode of operation. Therefore, the method of FIG. 5C proceeds to the step 788, and the time coordinator 470 applies the following values: $AT_N=72$, $ART_P=116$, $C=2$, and $AT_P=62$, to the condition: $AT_N >= ART_P + (1/C)*(AT_N - AT_P)$, to determine that the method of FIG. 5C should remain in the catch-up mode. Accordingly, the time coordinator 470 applies the following equation: $RT_N = ART_P + (1/C)*(AT_N - AT_P)$, using the same values, to determine that the next timer event 362C should occur at the real time value of 121.

At the real time 121, the time coordinator 470 notifies the timer emulator 462 of the timer event 362C at the step 762, and it updates the queue 472 at the step 764. This time, the next timer event for the timer 362 is due to occur at the apparent time 104, which is the same apparent time as the timer event 362D represented by the second entry in the queue 472. As a result, there is no need to reorganize the entries in the queue 472, and the queue now has the state illustrated in FIG. 6D. Specifically, the first entry comprises the fields 474A, 476A, 478A and 480A, containing the values VTIMER1, 104, Yes and 32, respectively; the second entry comprises the fields 474B, 476B, 478B and 480B, containing the values VTIMER2, 104, Yes and 48, respectively; and the third entry comprises the fields 474C, 476C, 478C and 480C, containing the values VTIMER3, 124, No and nothing, respectively. The time coordinator 470 again applies the following condition: $AT_N >= ART_P + (1/C)*(AT_N - AT_P)$, using the values: $AT_N=104$, $ART_P=121$, $C=2$, and $AT_P=72$, to determine that the method of FIG. 5C should remain in the catch-up mode. Accordingly, the time coordinator 470 applies the following equation: $RT_N = ART_P + (1/C)*(AT_N - AT_P)$, using the same values, to determine that the next timer events 362D and 364C should occur at the real time value of 137.

At the real time 137, the time coordinator 470 determines, at the step 760, that the timer 362 has the timer event 362D due and the timer 364 has the timer event 364C due, it notifies the timer emulators 462 and 464 of the respective timer events 362D and 364C at the step 762, and it updates the queue 472 at the step 764. This time, the entries for both the VTIMER1 362 and the VTIMER2 364 are updated and the queue 742 now has the state illustrated in FIG. 6E. Specifically, the first entry comprises the fields 474A, 476A, 478A and 480A, containing the values VTIMER3, 124, No and nothing, respectively; the second entry comprises the fields 474B, 476B, 478B and 480B, containing the values VTIMER1, 136, Yes and 32, respectively; and the third entry comprises the fields 474C, 476C, 478C and 480C, containing the values VTIMER2, 152, Yes and 48, respectively. The time coordinator 470 again applies the following condition: $AT_N \geq ART_P+(1/C)*(AT_N-AT_P)$, using the values: $AT_N=124$, $ART_P=137$, $C=2$, and $AT_P=104$, to determine that the method of FIG. 5C should remain in the catch-up mode. Accordingly, the time coordinator 470 applies the following equation: $RT_N=ART_P+(1/C)*(AT_N-AT_P)$, using the same values, to determine that the next timer event 366D should occur at the real time value of 147.

At the real time 147, the time coordinator 470 notifies the timer emulator 466 of the timer event 366D at the step 762, and it updates the queue 472 at the step 764. The time coordinator 470 again applies the following condition: $AT_N \geq ART_P+(1/C)*(AT_N-AT_P)$, using the values: $AT_N=136$, $ART_P=147$, $C=2$, and $AT_P=124$, to determine that the method of FIG. 5C should remain in the catch-up mode. Accordingly, the time coordinator 470 applies the following equation: $RT_N=ART_P+(1/C)*(AT_N-AT_P)$, using the same values, to determine that the next timer event 362E should occur at the real time value of 153.

At the real time 153, the time coordinator 470 notifies the timer emulator 462 of the timer event 362E at the step 762, and it updates the queue 472 at the step 764. The time coordinator 470 again applies the following condition: $AT_N \geq ART_P+(1/C)*(AT_N-AT_P)$, using the values: $AT_N=152$, $ART_P=153$, $C=2$, and $AT_P=136$, to determine that the method of FIG. 5C should remain in the catch-up mode. Accordingly, the time coordinator 470 applies the following equation: $RT_N=ART_P+(1/C)*(AT_N-AT_P)$, using the same values, to determine that the next timer event 364D should occur at the real time value of 161.

At the real time 161, the time coordinator 470 notifies the timer emulator 464 of the timer event 364D at the step 762, and it updates the queue 472 at the step 764. The time coordinator 470 again applies the following condition: $AT_N \geq ART_P+(1/C)*(AT_N-AT_P)$, using the values: $AT_N=168$, $ART_P=161$, $C=2$, and $AT_P=152$, to determine that the method of FIG. 5C should remain in the catch-up mode. Accordingly, the time coordinator 470 applies the following equation: $RT_N=ART_P+(1/C)*(AT_N-AT_P)$, using the same values, to determine that the next timer event 362F should occur at the real time value of 169.

At the real time 169, the time coordinator 470 notifies the timer emulator 462 of the timer event 362F at the step 762, and it updates the queue 472 at the step 764. The time coordinator 470 again applies the following condition: $AT_N \geq ART_P+(1/C)*(AT_N-AT_P)$, this time using the values: $AT_N=172$, $ART_P=169$, $C=2$, and $AT_P=168$. This time, however, the time coordinator 470 determines that the method of FIG. 5C should switch back to the normal mode of operation by returning to the step 784. Accordingly, the time coordinator 470 applies the following equation: $RT_N=NRT_P+(AT_N-AT_P)$, using the values: $NRT_P=168$, $AT_N=172$, and $AT_P=168$, to determine that the next timer event 366E should occur at the normal real time value of 172. The apparent time has now caught up to the real time, and subsequent timer events will occur at their normal times.

Thus, referring again to FIG. 7, the real time 8 in the physical computer system corresponds to the apparent time 8 in the VM 300, the real time 13 in the physical computer system corresponds to the apparent time 13 in the VM 300, the real time 34 in the physical computer system corresponds to the apparent time 34 in the VM 300, the real time 40 in the physical computer system corresponds to the apparent time 40 in the VM 300, the real time 113 in the physical computer system corresponds to the apparent time 56 in the VM 300, the real time 116 in the physical computer system corresponds to the apparent time 62 in the VM 300, the real time 121 in the physical computer system corresponds to the apparent time 72 in the VM 300, the real time 137 in the physical computer system corresponds to the apparent time 104 in the VM 300, the real time 147 in the physical computer system corresponds to the apparent time 124 in the VM 300, the real time 153 in the physical computer system corresponds to the apparent time 136 in the VM 300, the real time 161 in the physical computer system corresponds to the apparent time 152 in the VM 300, the real time 169 in the physical computer system corresponds to the apparent time 168 in the VM 300, and the real time 172 in the physical computer system corresponds to the apparent time 172 in the VM 300.

Now suppose that, at a real time 130 in FIG. 7, the guest software in the VM 300 were to attempt to read a value from one of the virtual timers 360, such as the VTIMER1 362. In response, the timer emulator 462 proceeds to the step 710 of FIG. 5A and retrieves an apparent time from the time coordinator 470. In response, the time coordinator 470 proceeds to the step 768 of FIG. 5B and reads the timer event queue 472. At this point, the queue 472 is in the state illustrated in FIG. 6D. Thus, the time coordinator 470 reads that the next timer event is due to occur at the apparent time of 104. Next, at the step 770, the time coordinator 470 uses the following equation:

$$AT_C=AT_L+((RT_C-RT_L)/(RT_N-RT_L))*(AT_N-AT_L),$$

using the values: $AT_L=72$, $RT_C=130$, $RT_N=137$, $RT_L=121$, and $AT_N=104$, to determine the current apparent time to be 90. At the step 772, the time coordinator 470 returns the apparent time of 90 to the timer emulator 462. The timer emulator 462 converts this apparent time into an appropriate counter value for the timer 362, updates the timer at the step 712 and returns the counter value to the guest software at the step 714.

In the preferred embodiment, the time coordinator 470 tries to run apparent time so that it's close to the real time. The apparent time may fall behind, however, because the VM 300 is descheduled for a period of time, as described above. The apparent time may also fall behind because the time coordinator 470 implements a minimum progress criterion for timer events. After any timer event, each virtual CPU 302 must make a certain amount of progress executing guest software before the time coordinator 470 will generate a subsequent timer event. This provision ensures that the guest software finishes processing the previous timer event and is ready for a subsequent timer event, before the subsequent timer event issues. The minimum amount of time that is provided for processing timer events may vary between the multiple virtual timers 360, and the minimum processing time that is to be provided for each virtual timer 360 may be included as an additional column in the timer event queue 472.

Also in the preferred embodiment, if apparent time falls moderately behind real time, the time coordinator 470 switches into the catch-up mode of operation, and the apparent time is run faster than real time until the apparent time catches up to real time. However, if apparent time falls behind real time by more than a threshold amount, then the time coordinator 470 may abruptly jump the apparent time forward to instantly catch up to real time, dropping any backlog of timer events.

Figure 2:
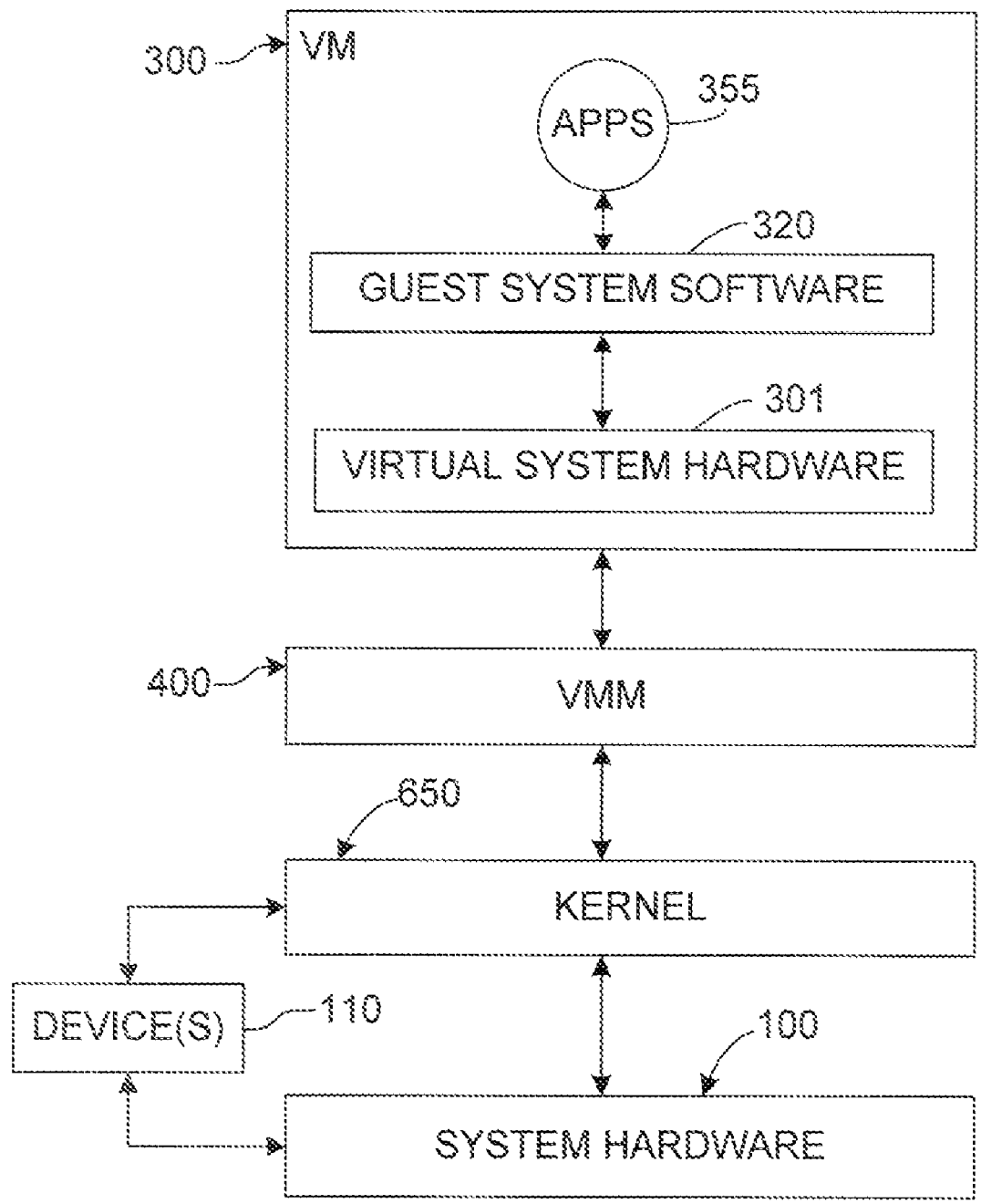
FIG. 2 illustrates an alternative configuration of a virtual computer system, which includes a kernel on which the VMM runs.

One particular embodiment of the invention has been described above, along with some variations of the main embodiment. A wide variety of other variations may also be implemented, resulting in a wide variety of possible embodiments. For example, the functional units described above may be organized in various other ways. For example, in some embodiments, the functionality of the device emulators 460 and the time coordinator 470 may be combined into a single software unit. In other embodiments, a single device emulator 460 may virtualize all of the virtual timers 360 in the system. In other embodiments, the same time emulator 470 may be used in conjunction with a plurality of VMMs, so that consistent timing is provided across multiple VMs. For example, the time emulator 470 may be implemented in a kernel, such as the kernel 650 of FIG. 2, which supports multiple VMMs.

Also, in various other embodiments, the methods of FIGS. 5A, 5B, and 5C may be changed substantially. In particular, the equations defined herein may be changed in a wide variety of ways in different embodiments of the invention. In addition, the structure, the content and the functionality of the timer event queue 472 may be changed in different embodiments of the invention, or the functionality of the queue 472 may be implemented in other structures or in other manners.

In one particular embodiment, the method of FIG. 5C is implemented in a manner that creates a hysteresis effect. The method does not go into the catch-up mode until the amount of time by which the apparent time falls behind the real time reaches a threshold value, and it does not return to the normal mode immediately when the apparent time catches up again. For example, at the step 782 of FIG. 5C, the time coordinator 470 may use the following condition to determine if the method should go into the catch-up mode: $RT_C > NRT_P + (AT_N - AT_P) + K_1$, where $K_1$ is a first time constant that may have a value of 50 milliseconds, for example, and the other variables are the same as described above in connection with the description of FIG. 5C. If the time coordinator 470 determines that this condition is true, then the method proceeds to catch-up mode by proceeding to the step 786; otherwise the method remains in normal mode by proceeding to the step 784. Also, at the step 788 of FIG. 5C, the time coordinator 470 may use the following condition to determine if the method should go back to the normal mode: $RT_C <= NRT_P + (AT_N - AT_P) - K_2$, where $K_2$ is a second time constant that may have a value of zero or some other value. If the time coordinator 470 determines that this condition is true, then the method returns to normal mode by proceeding to the step 784; otherwise the method remains in catch-up mode by proceeding to the step 786. As another alternative, the time coordinator 470 may use the following condition to determine if the method should go into the catch-up mode: $ART_P > NRT_P + K_1$, and may use the following condition to determine if the method should go back to the normal mode: $ART_P <= NRT_P - K_2$. Here again the constants $K_1$ and $K_2$, if nonzero, produce a hysteresis effect.

What is claimed is:

1. A method for emulating a plurality of virtual timers in a virtual computer system operating on a physical computer, the physical computer having a timer for keeping track of a real time for the physical computer, the virtual timers being programmable by guest software to generate a plurality of timer events, the method comprising:
   receiving programming information from the guest software for programming a first virtual timer;
   receiving programming information from the guest software for programming a second virtual timer;
   determining when the first virtual timer is set to generate timer events according to the real time, based on the programming information received from the guest software;
   determining when the second virtual timer is set to generate timer events according to the real time, based on the programming information received from the guest software;
   wherein the generation of timer events falls behind the real time, so that a first plurality of timer events, including one or more timer events of the first virtual timer and one or more timer events of the second virtual timer, are set to have already occurred according to the real time, but the first plurality of timer events have not yet occurred in the virtual computer system; and
   generating the first plurality of timer events in the same combined sequence as the timer events are set to occur according to the real time,
   wherein a catch-up mode is used when the generation of timer events in the virtual computer system is behind the real time,
   wherein a normal mode is used when the generation of timer events in the virtual computer system is caught up to the real time,
   wherein, when the catch-up mode is used, the average rate of timer events in the virtual computer system exceeds the average rate at which timer events are set to occur according to the real time,
   wherein, when the normal mode is used, the average rate of timer events in the virtual computer system is substantially the same as the average rate at which timer events are set to occur according to the real time, and
   wherein the real time being tracked by a timer in the physical computer.

2. A method for emulating a plurality of virtual timers in a virtual computer system operating on a physical computer, the physical computer having a timer for keeping track of a real time for the physical computer, the virtual timers being programmable by guest software to generate a plurality of timer events, the method comprising:
   receiving programming information from the guest software for programming a first virtual timer;
   receiving programming information from the guest software for programming a second virtual timer;
   determining when the first virtual timer is set to generate timer events according to the real time, based on the programming information received from the guest software;
   determining when the second virtual timer is set to generate timer events according to the real time, based on the programming information received from the guest software; and
   generating timer events for the first virtual timer and the second virtual timer in the same combined sequence as the timer events are set to occur according to the real time,
   wherein a catch-up mode is used when the generation of timer events in the virtual computer system is behind the real time,
   wherein a normal mode is used when the generation of timer events in the virtual computer system is caught up to the real time,
   wherein, when the catch-up mode is used, the average rate of timer events in the virtual computer system exceeds the average rate at which timer events are set to occur according to the real time,
   wherein, when the normal mode is used, the average rate of timer events in the virtual computer system is substantially the same as the average rate at which timer events are set to occur according to the real time, and wherein the real time being tracked by a timer in the physical computer.

3. The method of claim 2, wherein, when the normal mode is used, the interval between successive timer events in the virtual computer system is substantially the same as the interval between the same successive timer events as set according to the real time.

4. The method of claim 2, wherein the catch-up mode is entered substantially immediately when the generation of timer events in the virtual computer system falls behind the real time and the normal mode is entered substantially immediately when the generation of timer events in the virtual computer system catches up to the real time.

5. The method of claim 2, wherein, if the guest software attempts to read a read count value from a virtual timer, a returned count value is returned to the guest software that represents a returned time value that occurs after a preceding time value that is represented by a most recent preceding timer event and before a next time value that is represented by a next timer event to occur.

6. The method of claim 5, wherein the returned time value falls proportionately between the preceding time value and the next time value, based on the proportion at which the real time of the attempted reading of the read count value falls between the real time at which the most recent preceding timer event was generated and the real time at which the next timer event is scheduled to be generated.

7. The method of claim 2, wherein the method is performed by keeping track of an apparent time, which represents the time as it would appear to the guest software, as indicated by the virtual timers.

8. The method of claim 2, wherein the method is performed using a timer event queue.

9. A computer program embodied in a computer-readable storage medium, the computer program being executable on a physical computer as part of a virtual computer system, the physical computer having a timer for keeping track of a real time for the physical computer, the virtual computer system comprising one or more timer emulators for emulating a plurality of virtual timers, each of the plurality of virtual timers generating one or more timer events, the computer program comprising:

a time coordinator for coordinating the respective timer events of the plurality of virtual timers, the time coordinator:

determining how each of the plurality of virtual timers has been programmed;

based on how each of the virtual timers has been programmed, determining a relative sequence of timer events as set according to the real time; and notifying the one or more timer emulators when each of the plurality of virtual timers is to generate a timer event, so that the timer events are generated in the same combined sequence as the timer events are set to occur according to the real time, wherein the time coordinator has a catch-up mode that is used when the generation of timer events in the virtual computer system is behind the real time, and a normal mode that is used when the generation of timer events in the virtual computer system is caught up to the real time, wherein, when the time coordinator is in the catch-up mode, the average rate of timer events in the virtual computer system exceeds the average rate at which timer events are set to occur according to the real time, wherein, when the time coordinator is in the normal mode, the average rate of timer events in the virtual computer system is substantially the same as the average rate at which timer events are set to occur according to the real time, and wherein the real time being tracked by a timer in the physical computer.

10. The computer program of claim 9, wherein, when the time coordinator is in the catch-up mode, the interval between successive timer events in the virtual computer system is substantially proportional to the interval between the same successive timer events as set according to the real time.

11. The computer program of claim 9, wherein, when the time coordinator is in the normal mode, the interval between successive timer events in the virtual computer system is substantially the same as the interval between the same successive timer events as set according to the real time.

12. The computer program of claim 9, wherein the time coordinator enters the catch-up mode substantially immediately when the generation of timer events in the virtual computer system falls behind the real time and the time coordinator enters the normal mode substantially immediately when the generation of timer events in the virtual computer system catches up to the real time.

13. The computer program of claim 9, wherein, if a software entity attempts to read a read count value from a virtual timer, the time coordinator provides a value to one of the timer emulators, which causes the timer emulator to return a returned count value to the software entity that represents a returned time value that occurs after a preceding time value that is represented by a most recent preceding timer event and before a next time value that is represented by a next timer event to occur.

14. The computer program of claim 13, wherein the returned time value falls proportionately between the preceding time value and the next time value, based on the proportion at which the real time of the attempted reading of the count value falls between the real time at which the most recent preceding timer event was generated and the real time at which the next timer event is scheduled to be generated.

15. A method for coordinating a plurality of virtual timers in a virtual computer system, the virtual computer system operating within a physical computer system, the physical computer system having a timer for keeping track of a real time for the physical computer system, the method comprising:

receiving programming information for each of the virtual timers, indicating when each of the virtual timers is to generate timer events;

determining when each of the virtual timers is set to generate timer events according to the real time;

causing the virtual timers to generate timer events in the same combined sequence as the timer events are set to occur according to the real time;

determining an apparent time that appears to exist within the virtual computer system based on timing information provided by the virtual timers;

when the apparent time is substantially the same as the real time, generating timer events at substantially the same real time as the timer events are set to occur according to the real time;

when the apparent time is behind the real time, generating timer events at a faster rate than the timer events are set to occur according to the real time, until the apparent time catches up to the real time, and wherein the real time being tracked by a timer in the physical computer.

16. The method of claim 15, wherein, when the apparent time is behind the real time, the interval between successive timer events in the virtual computer system is substantially proportional to the interval between the same successive timer events as set according to the real time.

17. The method of claim 15, wherein timer events are generated at a faster rate than the timer events are set to occur according to the real time substantially immediately when the apparent time falls behind the real time, and wherein timer events are generated at substantially the same real time as the timer events are set to occur according to the real time substantially immediately when the apparent time catches up to the real time.

18. The method of claim 15, wherein, if a software entity within the virtual computer system attempts to read a read count value from a virtual timer, a returned count value is returned to the software entity that represents a returned time value that occurs after a preceding time value that is represented by a most recent preceding timer event and before a next time value that is represented by a next timer event to occur.

19. The method of claim 18, wherein the returned time value falls proportionately between the preceding time value and the next time value, based on the proportion at which the real time of the attempted reading of the read count value falls between the real time at which the most recent preceding timer event was generated and the real time at which the next timer event is scheduled to be generated.

* * * * *